United States Patent
Yoneda et al.

(10) Patent No.: US 8,076,434 B1
(45) Date of Patent: *Dec. 13, 2011

(54) AMPHOTERIC POLYMER AND PROCESS FOR PRODUCING THE SAME

(75) Inventors: Atsuro Yoneda, Osaka (JP); Daisuke Michitaka, Osaka (JP)

(73) Assignee: Nippon Shokubai Co., Ltd, Kita-ku, Osaka-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/976,242

(22) Filed: Dec. 22, 2010

Related U.S. Application Data

(63) Continuation-in-part of application No. 12/971,433, filed on Dec. 17, 2010.

(51) Int. Cl.
*C08F 26/02* (2006.01)

(52) U.S. Cl. ............ 526/312; 526/310; 526/317.1; 526/332; 526/333; 528/332; 528/363; 528/422; 528/425; 564/291; 564/292; 564/294; 564/463; 564/503; 564/504; 564/505

(58) Field of Classification Search .......... 526/310, 526/312, 317.1, 332, 333; 528/332, 363, 528/422, 425; 564/291, 292, 294, 463, 503, 564/504, 505
See application file for complete search history.

(56) References Cited

U.S. PATENT DOCUMENTS

| | | | |
|---|---|---|---|
| 4,687,824 A | * | 8/1987 | Vaughn .................. 526/292.2 |
| 2008/0262192 A1 | | 10/2008 | Yoneda et al. |

FOREIGN PATENT DOCUMENTS

| | | | |
|---|---|---|---|
| JP | 05302289 A | * | 11/1993 |
| JP | 05311194 A | * | 11/1993 |
| JP | 2008-523162 | | 7/2008 |

* cited by examiner

*Primary Examiner* — Vasu Jagannathan
*Assistant Examiner* — Richard A Huhn
(74) *Attorney, Agent, or Firm* — Connolly Bove Lodge & Hutz LLP

(57) ABSTRACT

The present invention has an object to provide an amphoteric polymer having high anti-soil redeposition ability and solubility with surfactants, and a process for producing the same. The amphoteric polymer includes: a structure unit (a) derived from a cationic group-containing monomer (A); and a structure unit (b) derived from a carboxyl group-containing monomer (B). The structure unit (a) is present at a level of 1 to 99% by mass based on 100% by mass of all structure units derived from all monomers in the amphoteric polymer, and the structure unit (b) is present at a level of 1 to 99% by mass based on 100% by mass of all the structure units derived from all the monomers in the amphoteric polymer.

12 Claims, No Drawings

AMPHOTERIC POLYMER AND PROCESS FOR PRODUCING THE SAME

CROSS REFERENCE TO RELATED APPLICATIONS

This application is a continuation-in-part of co-pending application Ser. No. 12/971,433, filed on Dec. 17, 2010, the entire contents of which is hereby incorporated by reference.

TECHNICAL FIELD

The present invention relates to an amphoteric polymer and a process for producing the same, and more specifically to an amphoteric polymer useful as a raw material for detergent additives and the like, and a process for producing the same.

BACKGROUND ART

Numerous high-performance polymers are used and studied in various applications such as detergent additives, water treatment agents, and fiber treating agents. Detergent additives are used in combination with surfactants to improve detergent performance such as washing performance and performance of preventing soil components, which are removed from clothes in washing treatment, from reattaching to clothes (i.e. performance of preventing soil redeposition).

For example, Patent Document 1 discloses a polymer suitably used as a detergent additive. Specifically, the polymer is a water-soluble polymer essentially having an amino group-containing monomer unit represented by the formula below and a molecular weight distribution of not more than 12. Patent Document 1 teaches that this polymer is excellent in the chelate effect, clay dispersibility, and anti-soil redeposition ability and therefore is suitably used as a detergent additive, for example, as a detergent builder.

[Chem. 1]

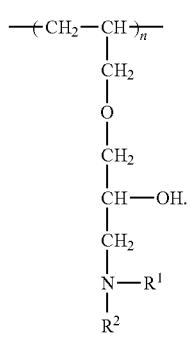

In the formula, $R^1$ and $R^2$ each represent H or an organic group, and each of $R^1$ and $R^2$ may be the same as or different from each other.
[Citation List]
[Patent Document]
Patent Document 1: Japanese Patent Publication (Kohyo) No. 2008-523162

SUMMARY OF THE INVENTION

Problems to be Solved by the Invention

As described above, numerous polymers suitable as detergent additives and the like are under study, and examples thereof include amphoteric polymers having an anionic group and a cationic group in the molecular structure, in addition to the above-described polymer.

Nowadays, the required level of performance of detergent additives has been rising with growing concern of consumers for environmental problems. For example, many consumers have been changing their washing machines to drum washing machines to reduce water consumption and drainage. In washing treatment under water-saving conditions, soil redeposition on clothes is a more serious problem compared to under conditions in which a large amount of water is used. Therefore, the required level of anti-soil redeposition ability of detergent additives is higher than before. For drum washing machines, which use less water, liquid detergents are likely to be chosen because they are likely to dissolve without residue. Accordingly, there is a growing demand for liquid detergents, particularly concentrated liquid detergents whose surfactant content is not less than 50%. This demand has created a need for detergent additives that are suitably used in concentrated liquid detergents and are more compatible with surfactants than conventional detergent additives.

Conventional techniques should be thoroughly revised so that polymers that meet the above-described recent needs and are suitably used as detergent additives with higher performance are provided.

Considering the above-described background, the present invention aims to provide an amphoteric polymer having high anti-soil redeposition ability and compatibility with surfactants, and to provide a process for producing the same.

Means for Solving the Problems

The present inventors examined polymers that are suitably used as detergent additives and the like. The examination revealed that the use of an amphoteric polymer having an anionic group and cationic group separated from each other by a nonionic spacer like a polyalkylene glycol chain therebetween in the molecular structure as a detergent additive improves dispersability of soil particles which is a contributory factor to washing performance, and that a polymer essentially containing a structure unit derived from a specific cationic group-containing monomer and a structure unit derived from a carboxyl group-containing monomer has high anti-soil redeposition ability and compatibility with surfactants. Furthermore, the present inventors found that a polymer containing the structure units at levels adjusted within a specific range has more improved performance, and that such a polymer is suitably used as a detergent additive that meets the recent needs. Thus, the present inventors found a way to solve the above-described problems and completed the present invention.

Specifically, the present invention provides an amphoteric polymer containing: a structure unit (a) derived from a cationic group-containing monomer represented by the formula (1) or (1'); and a structure unit (b) derived from a carboxyl group-containing monomer. The structure unit (a) is present at a level of 1 to 99% by mass based on 100% by mass of all structure units derived from all monomers in the amphoteric polymer, and the structure unit (b) is present at a level of 1 to 99% by mass based on 100% by mass of all the structure units derived from all the monomers in the amphoteric polymer.

[Chem. 2]

[Chem. 3]

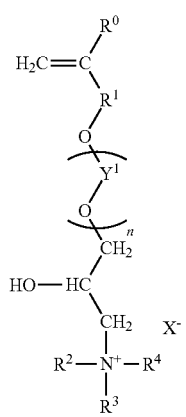
(1)

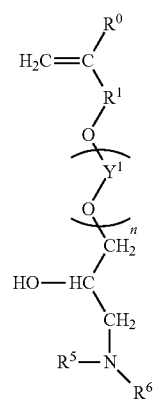
(1')

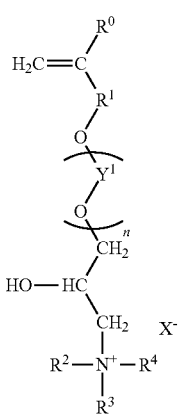
(1)

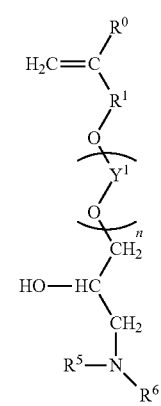
(1')

In the formulae, $R^0$ represents H or $CH_3$; $R^1$ represents $CH_2$, $CH_2CH_2$, or a direct bond; $R^2$, $R^3$, and $R^4$ each represent a $C_{1-20}$ organic group, and each of $R^2$, $R^3$, and $R^4$ may be the same as or different from each other; $R^5$ and $R^6$ each represent H or a $C_{1-20}$ organic group and may be the same as or different from each other; $Y^1$ represents a $C_{2-20}$ alkylene group, and each of $Y^1$s may be the same as or different from each other; n represents an average addition number of moles of oxyalkylene groups ($-Y^1-O-$) and is from 1 to 300; and $X^-$ represents a counteranion.

Another aspect of the present invention is a process for producing an amphoteric polymer. The process includes polymerizing a cationic group-containing monomer (A) represented by the formula (1) or (1') and a carboxyl group-containing monomer (B). In the process, the monomer (A) is added at a level of 1 to 99% by mass based on 100% by mass of all monomers to be added, and the monomer (B) is added at a level of 1 to 99% by mass based on 100% by mass of all the monomers to be added.

In the formulae, $R^0$ represents H or $CH_3$; $R^1$ represents $CH_2$, $CH_2CH_2$, or a direct bond; $R^2$, $R^3$, and $R^4$ each represent a $C_{1-20}$ organic group, and each of $R^2$, $R^3$, and $R^4$ may be the same as or different from each other; $R^5$ and $R^6$ each represent H or a $C_{1-20}$ organic group and may be the same as or different from each other; $Y^1$ represents a $C_{2-20}$ alkylene group, and each of $Y^1$s may be the same as or different from each other; n represents an average addition number of moles of oxyalkylene groups ($-Y^1-O-$) and is from 1 to 300; and $X^-$ represents a counteranion.

Hereinafter, the present invention is described in more detail.

(Amphoteric Polymer of the Present Invention)

The term "amphoteric polymer" used herein is intended to include polymers that contain both of a cationic group and an anionic group in the molecular.

<Cationic Group-Containing Monomer (A)>

The amphoteric polymer of the present invention essentially contains the structure unit (a) derived from the cationic group-containing monomer (A) represented by the formula (1) or (1'):

[Chem 4]

-continued

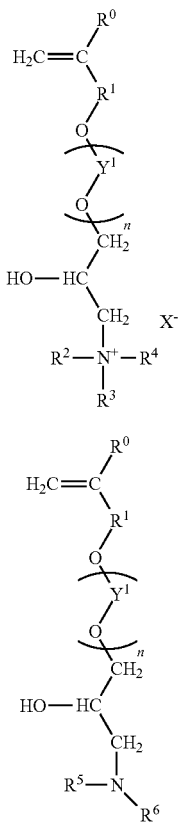

wherein $R^0$ represents H or $CH_3$; $R^1$ represents $CH_2$, $CH_2CH_2$, or a direct bond; $R^2$, $R^3$, and $R^4$ each represent a $C_{1-20}$ organic group, and each of $R^2$, $R^3$, and $R^4$ may be the same as or different from each other; $R^5$ and $R^6$ each represent H or a $C_{1-20}$ organic group and may be the same as or different from each other; $Y^1$ represents a $C_{2-20}$ alkylene group, and each of $Y^1$s may be the same as or different from each other; n represents an average addition number of moles of oxyalkylene groups (—$Y^1$—O—) and is from 1 to 300; and $X^-$ represents a counteranion.

The amphoteric polymer of the present invention contains at least one of the structure unit (a) derived from the monomer (A) represented by the formula (1) and the structure unit (a) derived from the monomer (A) represented by the formula (1'). In other words, the amphoteric polymer of the present invention contains either one or both of the structure units.

In the present invention, groups that are converted to cations in the presence of an acid, like the amino group in the formula (1'), are also referred to as "cationic groups".

When $R^1$ in the formula (1) or (1') is a direct bond, the structure $H_2C=C(R^0)—R^1—O—$ in the formula (1) or (1') is $H_2C=C)(R^0)—O—$. In the following cases, the structure will be the following groups:
  a metallyl group when $R^0$ is $CH_3$ and $R^1$ is $CH_2$;
  an isoprenyl group when $R^0$ is $CH_3$ and $R_1$ is $CH_2CH_2$;
  an isopropenyl group when $R^0$ is $CH_3$ and $R_1$ is a direct bond;
  an allyl group when $R^0$ is H and $R^1$ is $CH_2$;
  a butenyl group when $R^0$ is H and $R^1$ is $CH_2CH_2$; and
  a vinyl group when $R^0$ is H and $R^1$ is a direct bond.

The group containing the polymerizable double bond between carbons, that is, $H_2C=C)(R^0—R^1—$ in the cationic group-containing monomer (A) is preferably an isoprenyl group, metallyl group, allyl group, or vinyl group. Isoprenyl, metallyl, and allyl groups are more preferable, and isoprenyl and metallyl groups are further more preferable because they provide high polymerizability.

In the formula (1), $R^2$, $R^3$, and $R^4$ each represent a $C_{1-20}$ organic group, and each of $R^2$, $R^3$, and $R^4$ may be the same as or different from each other. In the formula (1'), $R^5$ and $R^6$ each represent H or a $C_{1-20}$ organic group and may be the same as or different from each other. The $C_{1-20}$ organic groups are not particularly limited, provided that they contain 1 to 20 carbon atoms in total. Preferred examples thereof include alkyl groups, aryl groups, and alkenyl groups. When the organic groups are alkyl groups, aryl groups, and/or alkenyl groups, one or two hydrogen atoms therein may or may not be substituted with other organic group (s). Examples of the other organic groups include alkyl groups (in this case, when the organic groups represented by $R^2$, $R^3$, and/or $R^4$ are alkyl groups, the organic groups with substitutent(s) are regarded as unsubstituted alkyl groups as a whole), aryl groups, alkenyl groups, alkoxy groups, hydroxyl group, acyl groups, ether groups, amide groups, ester groups, ketone groups, carboxyl group, carboxylate group, sulfonic acid group, and sulfonate groups.

The number of carbons in each of $R^2$, $R^3$, $R^4$, $R^5$ and $R^6$ is preferably 1 to 8, more preferably 1 to 5, and further more preferably 1 or 2. These structures enable the cationic group-containing monomer (A) to be produced with high yield and therefore improve the polymerizability of the monomer and the purity of the resulting polymer. In addition, the anti-soil redeposition ability of the resulting polymer is also improved.

Specific examples of $R^2$, $R^3$, and $R^4$ include alkyl groups such as methyl group, ethyl group, isopropyl group, n-propyl group, n-butyl group, isobutyl group, octyl group, lauryl group, stearyl group, cyclohexyl group, and 2-ethylhexyl group; alkenyl groups such as butylene group, octylene group, and nonylene group; aryl groups such as phenyl group, benzyl group, phenethyl group, 2,3- and 2,4-xylyl groups, mesityl group, and naphthyl group; and groups obtained by substituting part of hydrogen atoms in the above groups with alkoxy groups, carboxyl ester groups, amino groups, amide groups, hydroxyl groups, carboxyl groups, carboxylate groups, sulfonic acid groups, and sulfonate groups (e.g. hydroxyethyl group, hydroxypropyl group). Among the above examples, methyl group and ethyl group are preferable because they improve the anti-soil redeposition ability of the resulting polymer.

$R^2$ and $R^3$ in the formula (1) and $R^5$ and $R^6$ in the formula (1') may be linked to each other and form a ring together. In this case, the ring composed of the nitrogen atom, $R^2$, and $R^3$ and the ring composed of the nitrogen atom, $R^5$, and $R^6$ are preferably three- to seven-membered rings because these ring structures are stable. Namely, both of the total number of the carbon atoms in $R_2$ and $R_3$ and the total number of the carbon atoms in $R^5$ and $R^6$ are preferably 2 to 6.

In the formulae (1) and (1'), $Y^1$ is a $C_{2-20}$ alkylene group, and each of $Y^1$s may be the same as or different from each other. $Y^1$ is preferably a $C_{2-4}$ alkylene group, and more preferably a $C_{2-3}$ alkylene group because they improve the polymerizability of the cationic group-containing monomer (A). Specifically, $C_{2-4}$ alkylene groups such as ethylene group, propylene group, and butylene group are preferable, and $C_{2-3}$ alkylene groups such as ethylene group and propylene group are more preferable. The cationic group-containing monomer (A) may contain one or more of the above alkylene groups. In the case that the cationic group-containing monomer (A) contains two or more of the alkylene groups, the added oxyalkylene groups each represented by —Y$^1$—O— may be arranged in any fashion such as a random, block, or alternating fashion.

In the formula (1), n represents an average of the number of the added oxyalkylene groups (—Y$^1$—O—) and is from 1 to 300. Preferably, n is not less than 5, more preferably not less than 10, and further more preferably not less than 20. With these structures, the anionic group and the cationic group in the resulting polymer are separated from each other such that the anti-soil redeposition ability of the polymer is strikingly improved. To ensure high polymerizability of the cationic group-containing monomer (A), n is preferably not more than 200, more preferably not more than 150, and further more preferably not more than 100.

When the cationic group-containing monomer (A) includes a quaternary nitrogen atom, the counteranion X$^-$ is present near the quaternary nitrogen atom. The counteranion X$^-$ is not particularly limited and is preferably selected from halogen ions and alkyl sulfate ions. Specific examples of halogen ions include chlorine ion, bromine ion, iodine ion, and fluorine ion. Among these, chlorine ion, bromine ion, and iodine ion are preferable, and chlorine ion is more preferable. Specific examples of alkyl sulfate ions include methyl sulfate ion, and ethyl sulfate ion. Among these, methyl sulfate ion is preferable.

The amphoteric polymer of the present invention contains the structure unit (a) derived from the cationic group-containing monomer (A). The structure unit (a) is represented by the formula (2) or (2') in which the double bond between carbons in the cationic group-containing monomer (A) is converted to a single bond.

[Chem 5]

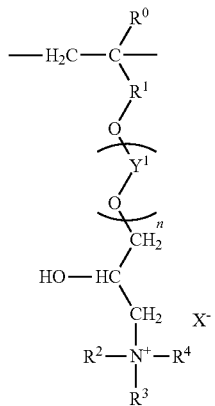

(2)

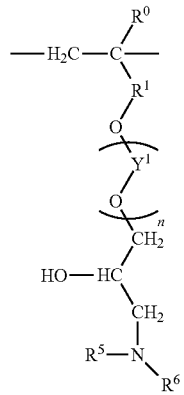

(2')

In the formula, R$^0$ represents H or CH$_3$; R$^1$ represents CH$_2$, CH$_2$CH$_2$, or a direct bond; R$^2$, R$^3$, and R$^4$ each represent a C$_{1-20}$ organic group, and each of R$^2$, R$^3$, and R$^4$ may be the same as or different from each other; R$^5$ and R$^6$ each represent H or a C$_{1-20}$ organic group and may be the same as or different from each other; Y$^1$ represents a C$_{2-20}$ alkylene group, and each of Y$^1$s may be the same as or different from each other; n represents an average addition number of moles of oxyalkylene groups (—Y$^1$—O—) and is from 1 to 300; and X$^-$ represents a counteranion.

The phrase "the amphoteric polymer of the present invention contains the structure unit (a) derived from the cationic group-containing monomer (A)" means that the final polymer product contains the structure units represented by the formula (2) and/or the formula (2'). Specifically, the term "the structure unit (a) derived from the cationic group-containing monomer (A)" used herein is intended to include structure units introduced in a step before or after the polymerization reaction such as structure units added by introducing side chains of specific structures after a main chain structure of the amphoteric polymer is formed by copolymerization, in addition to structure units introduced in the polymer by synthesizing the cationic group-containing monomer (A) and copolymerizing the cationic group-containing monomer (A) and other monomers.

The amphoteric polymer of the present invention contains the structure unit (a) at a level of 1 to 99% by mass based on 100% by mass of all structure units derived from all monomers in the amphoteric polymer (i.e. the monomer unit (a), and monomer units (b) and (e) described below). With the structure unit (a) at a level within this range, the polymer has strikingly improved anti-soil redeposition ability and compatibility with surfactants. The level of the structure unit (a) is preferably 2 to 90% by mass, more preferably 3 to 70% by mass, and further more preferably 5 to 40% by mass.

The mass ratio (% by mass) of the structure unit (a) to all the structure units derived from all the monomers and the mass ratio of the monomer (A) to all the monomers are calculated without counting the mass of the counteranion.

The structure units (a) in the amphoteric polymer of the present invention may all be of the same structure or may be of two or more different structures.

When the amphoteric polymer of the present invention contains the structure unit (a) derived from the monomer represented by the formula (1) and the structure unit (a) derived from the monomer represented by the formula (1'), the amount of the structure unit (a) is determined by the total amount of the both structure units.

Preferably, the amphoteric polymer of the present invention essentially contains the structure unit represented by the formula (2) as the structure unit (a) because the structure unit provides particularly improved anti-soil redeposition ability. The amphoteric polymer preferably contains the structure unit represented by the formula (2) at a level of 1 to 99% by mass based on 100% by mass of all the structure units, derived from all the monomers in the amphoteric polymer.

<Process for Producing Cationic Group-Containing Monomer (A)>

The above cationic group-containing monomer (A), although being produced by an applicable production process known in the art, is preferably produced by any of the following processes (1) to (4) when the cationic group-containing monomer (A) has the structure unit derived from the cationic group-containing monomer (A) represented by the formula (1). These processes enable the cationic group-containing monomer (A) to be produced with high yield. The cationic group-containing monomer (A) is preferably produced by the steps (A) and (C) when it has the structure unit derived from the cationic group-containing monomer (A) represented by the formula (1').

The production process (1) includes: (i) reacting a polyalkyleneglycol chain-containing monomer represented by the formula (3), an epihalohydrin, and an alkali compound (step A); and (ii) reacting the reaction product obtained in the step A and a tertiary amine salt (step B).

The production process (2) includes: (i) reacting a polyalkyleneglycol chain-containing monomer represented by the formula (3), an epihalohydrin, and an alkali compound (step A); (ii) reacting the reaction product obtained in the step A and a secondary amine (step C); and (iii) reacting the reaction product obtained in the step C and a quaternizing agent (step D).

The production process (3) includes: (i) reacting a polyalkyleneglycol chain-containing monomer represented by the formula (3) and an epihalohydrin in the presence of a catalyst (step E); and (ii) reacting the reaction product obtained in the step E and a tertiary amine (step F).

The production process (4) includes: (i) reacting a polyalkyleneglycol chain-containing monomer represented by the formula (3) and a glycidyltrialkylammonium salt (step G).

[Chem 6]

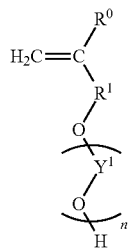

(3)

In the formula, $R^0$ represents H or $CH_3$; $R^1$ represents $CH_2$, $CH_2CH_2$, or a direct bond; $Y^1$ represents a $C_{2-20}$ alkylene group, and each of $Y^1$s may be the same as or different from each other; and n represents an average addition number of moles of oxyalkylene groups ($-Y^1-O-$) and is from 1 to 300.

Preferred examples of $R^0$, $R^1$, and $Y^1$ are the same as those of $R^0$, $R^1$, and $Y^1$ in the formula (1).

Examples of the polyalkylene glycol chain-containing monomers represented by the formula (3) include compounds obtained by a process known in the art, adding alkylene oxides to alkylene glycol monovinyl ethers, (meth)allyl alcohol, isoprenol and compounds having alkylene oxide structures added thereto. These compounds improve the purity of the resulting cationic group-containing monomer (A).

The epihalohydrins used in the production processes (1) to (3) are preferably epihalohydrins represented by the formula (4)

[Chem 7]

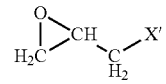

(4)

wherein X' represents a halogen atom. Specific examples of epihalohydrins include epichlorohydrin, epibromohydrin, and epiiodhydrin. Epichlorohydrin is preferable among these because of its industrially low price.

The tertiary amine salt used in the production process (1) is preferably a tertiary amine salt represented by the formula 5):

[Chem 8]

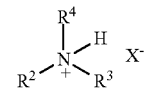

(5)

wherein $R^2$, $R^3$, and $R^4$ each represent a $C_{1-20}$ organic group, and each of $R^2$, $R^3$, and $R^4$ may be the same as or different from each other. $R^2$ and $R^3$ may be linked to each other and form a ring together. $X^-$ represents a counteranion.

Preferred examples of $R^2$, $R^3$, $R^4$, and $X^-$ in the formula (5) are the same as those of $R^2$, $R^3$, $R^4$, and $X^-$ in the formula (1).

Specific examples of the tertiary amine salt include hydrochlorides, hydrobromides, hydriodides, nitrates, acetates, perchlorates, and p-toluenesulfonates of tertiary amines such as trimethylamine, dimethylethylamine, dimethylisopropylamine, dimethyl-n-propylamine, dimethylcyclohexylamine, triethylamine, triisopropylamine, tri-n-propylamine, tributylamine, trilaurylamine, tristearylamine, tricyclohexylamine, tri-2-ethylhexylamine, triethanolamine, and tris(2-hydroxypropyl)amine. Trimethylamine hydrochloride, triethylamine hydrochloride, and dimethylethylamine hydrochloride are preferable among these because they enable the cationic group-containing monomer (A) used in the present invention to be produced with high yield.

The secondary amine used in the production process (2) is preferably a secondary amine represented by the formula (6):

[Chem 9]

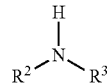

(6)

wherein $R^2$ and $R^3$ each represent a $C_{1-20}$ organic group, and, each of $R^2$ and $R^3$ may be the same as or different from each other. $R^2$ and $R^3$ may be linked to each other and form a ring together.

Preferred examples of $R^2$ and $R^3$ in the formula (6) are the same as those of $R^2$ and $R^3$ in the formula (1).

Specific examples of the secondary amine include: dialkylamines such as dimethylamine, methylethylamine, diethylamine, diisopropylamine, di-n-propylamine, di-n-butylamine, dioctylamine, dilaurylamine, distearylamine, dicyclohexylamine, and di-2-ethylhexylamine; dialkanolamines such as diethanolamine and bis(2-hydroxypropyl)amine; and cyclic amines such as morpholine and pyrrole. Dimethylamine, methylethylamine, diethylamine, and diethanolamine are preferable among these because they enable the cationic group-containing monomer (A) to be produced with high yield.

Examples of the quaternizing agent used in the production process (2) include alkyl halides such as methyl chloride, ethyl chloride, methylbromide, ethylbromide, methyl iodide, and ethyl iodide; benzyl halides such as benzyl chloride, benzyl bromide, and benzyl iodide; dialkyl sulfates such as dimethyl sulfate and diethyl sulfate; and alkyl sulfonates such as methyl p-toluenesulfonate and ethyl p-toluenesulfonate. Methyl chloride, benzyl chloride, and dimethyl sulfate are preferable among these because they are easily available.

In the case that the cationic group-containing monomer (A) represented by the formula (1') is produced by the steps (A) and (C), ammonia or a primary amine can be used instead of the secondary amine in the step (C).

Examples of the primary amine include alkylamines such as methylamine, ethylamine, isopropylamine, n-propylamine, n-butylamine, octylamine, laurylamine, stearylamine, cyclohexylamine, and 2-ethylhexylamine; and alkanolamines such as ethanolamine and 2-hydroxypropylamine. Among these, methylamine, ethylamine, and ethanolamine are preferable because they enable the cationic group-containing monomer (A) to be produced with high yield.

The tertiary amine used in the production process (3) is preferably a tertiary amine represented by the formula (7):

[Chem. 10]

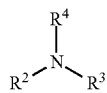

(7)

wherein $R^2$, $R^3$, and $R^4$ each represent a $C_{1-20}$ organic group, and each of $R^2$, $R^3$, and $R^4$ may be the same as or different from each other. $R^2$ and $R^3$ may be linked to each other and form a ring together.

Preferred examples of $R^2$, $R^3$, and $R^4$ in the formula (7) are the same as those of $R^2$, $R^3$, and $R^4$ in the formula (1).

Specific examples of the tertiary amine include trialkylamines such as trimethylamine, dimethylethylamine, dimethylisopropylamine, dimethyl-n-propylamine, dimethylcyclohexylamine, triethylamine, triisopropylamine, tri-n-propylamine, tributylamine, trilaurylamine, tristearylamine, tricyclohexylamine, and tri-2-ethylhexylamine; and trialkanolamines such as triethanolamine and tris(2-hydroxypropyl)amine. Trimethylamine, dimethylethylamine, triethylamine, and triethanolamine are preferable among these because they enable the cationic group-containing monomer (A) to be produced with high yield.

The glycidyltrialkylammonium salt used in the production process (4) is preferably a glycidyltrialkylammonium salt represented by the formula (8):

[Chem. 11]

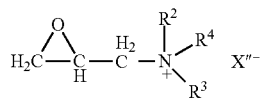

(8)

wherein $R^2$, $R^3$, and $R^4$ each represent a $C_{1-20}$ organic group, and each of $R^2$, $R^3$, and $R^4$ may be the same as or different from each other. $R^2$ and $R^3$ may be linked to each other and form a ring together. $X''^-$ represents a halogen ion.

Preferred examples of $R^2$, $R^3$, and $R^4$ in the formula (8) are the same as those of $R^2$, $R^3$, and $R^4$ in the formula (1).

Specific examples of the glycidyltrialkylammonium salt include glycidyltrimethylammonium chloride, glycidyltriethylammonium chloride, glycidyltrimethylammonium bromide, and glycidyltriethylammonium bromide. Glycidyltrimethylammonium chloride is preferable among these because it is easily available.

The steps of the production processes (1) to (4) are represented by the reaction schemes below.

[Chem 12]

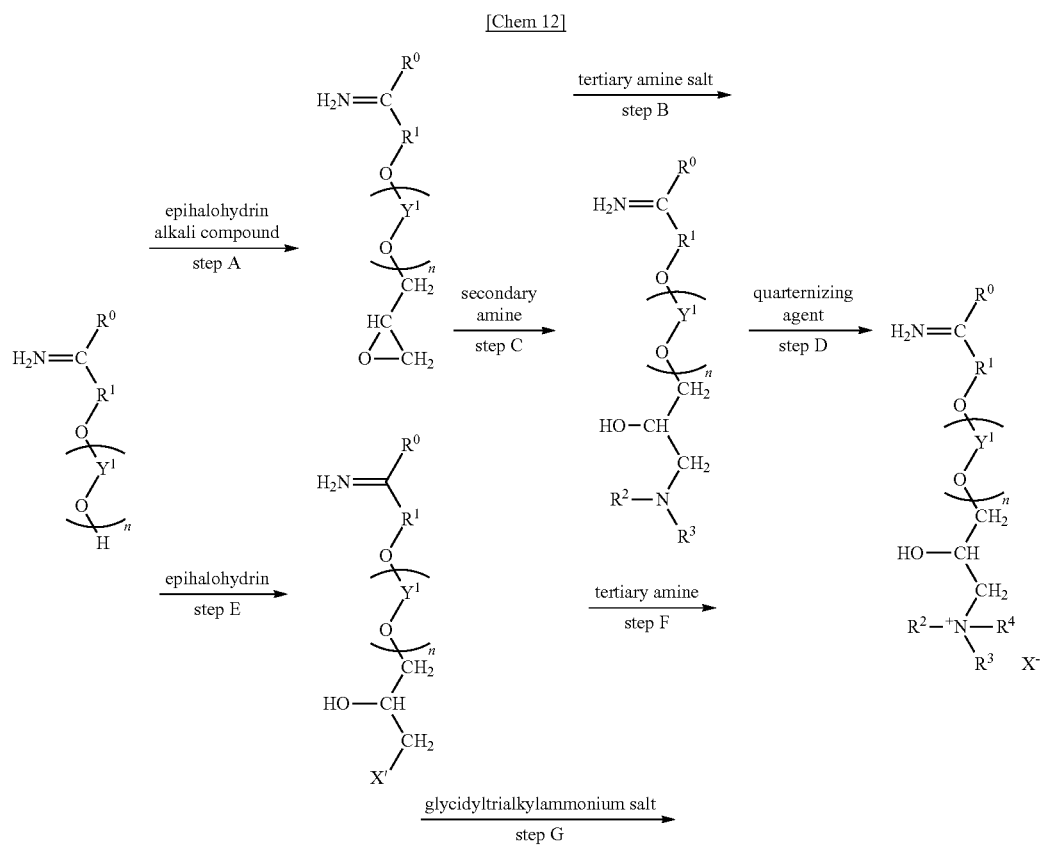

The reaction in the step A is carried out in the presence of an alkali compound, optionally in the presence of a phase transfer catalyst and/or a solvent.

The alkali compound is not particularly limited and is preferably an alkali metal hydroxide such as sodium hydroxide or potassium hydrate.

The amount of the alkali compound is determined based on the molar ratio between the alkali compound and hydroxyl groups in the polyalkyleneglycol chain-containing monomer represented by the formula (3) (in terms of hydroxyl value), and the molar ratio (hydroxyl group)/(alkali compound) is preferably 15/1 to 1/15, more preferably 5/1 to 1/5, and further more preferably 3/1 to 1/3.

The alkali compound may be charged into the reaction system directly or in an aqueous solution form. In the case of an aqueous solution, water (including by-product water produced with the progress of the reaction) may be removed during the reaction.

The phase transfer catalyst is not particularly limited, and examples thereof include quarternary ammonium salts such as tetramethylammoniumchloride, tetrabuthylammoniumchloride, tetraoctylammonium chloride, benzyltrimethylammonium chloride, triethylammonium chloride, and triethylammonium bromide; phosphonium salts such as tetrabutyl phosphonium chloride and tetrabutyl phosphonium bromide; and crown ethers such as 15-crown-5,18-crown-6.

The amount of the epihalohydrin used in each of the reactions in the steps A and E is determined based on the molar ratio between the epihalohydrin and hydroxyl groups in the polyalkyleneglycol chain-containing monomer represented by the formula (3) (in terms of hydroxyl value), and the molar ratio (hydroxyl group)/(epihalohydrin) is preferably 1/1 to 1/30, more preferably 1/1 to 1/10, and further more preferably 1/1 to 1/5. The use of the epihalohydrin at a ratio out of this range may result in formation of crosslinkable components and thus may cause gelation during polymerization.

The reaction in the step A is a so-called slurry reaction and may be carried out using a common reaction device equipped with a stirrer. For example, the reaction may be carried out in a stirred tank reactor of any type such as a batch, semi-batch, or continuous type. It is preferable to perform steps such as desalination and removal of excess epihalohydrin after the step A and before the step B or C. The desalination step is not particularly limited and may be carried out, for example, by sedimentation, centrifugation or filtration. The conditions of the desalination step are appropriately set so that salts are sufficiently removed. The temperature in the desalination step is preferably 15° C. to 100° C. At temperatures within this range, the separation proceeds at a sufficient rate. Excess epihalohydrin can be easily removed by distillation, evaporation, or the like.

The amount of the tertiary amine salt used in the step B is determined based on the molar ratio between the tertiary amine salt and glycidyl groups in the reaction product obtained in the step A, and the molar ratio (glycidyl group)/(tertiary amine salt) is preferably 2/1 to 1/2, more preferably 1.5/1 to 1/1.5, and further more preferably 1.3/1 to 1/1.3.

The tertiary amine salt may be used in the form of an aqueous solution. In this case, an aqueous solution containing the tertiary amine salt at a level of not less than 5% by mass is preferable, an aqueous solution containing the tertiary amine salt at a level of not less than 10% by mass is more preferable, and an aqueous solution containing the tertiary amine salt at a level of not less than 15% by mass is furthermore preferable.

If the tertiary amine salt is used at a level of less than 5% by mass, the selectivity of the cationic group-containing monomer (A) produced by the reaction will be low.

The amount of the secondary amine used in the step C is determined based on the molar ratio between the secondary amine and glycidyl groups in the reaction product obtained in the step A, and the molar ratio (glycidyl group)/(secondary amine) is preferably 2/1 to 1/2, more preferably 1.5/1 to 1/1.5, and further more preferably 1.3/1 to 1/1.3.

The amount of the quaternizing agent used in the step D is determined based on the molar ratio between the quaternizing agent and amino groups in the reaction product obtained in the step C, and the molar ratio (amino group)/(quaternizing agent) is preferably 2/1 to 1/2, more preferably 1.5/1 to 1/1.5, and further more preferably 1.3/1 to 1/1.3.

An acid or base may be used as a catalyst in the step E, and an acid is preferably used. Examples of acids include Lewis acids or Bronsted acids, and Lewis acids are preferable. Examples of Lewis acids include common "Lewis acids" such as boron trifluoride, tin tetrachloride, tin dichloride, zinc chloride, ferric chloride, aluminum chloride, titanium tetrachloride, magnesium chloride, and antimony pentachloride.

The amount of the tertiary amine used in the step F is determined based on the molar ratio between the tertiary amine and halogen groups in the reaction product obtained in the step E, and the molar ratio (halogen group)/(tertiary amine) is preferably 2/1 to 1/2, more preferably 1.5/1 to 1/1.5, and further more preferably 1.3/1 to 1/1.3.

The step F may be carried out after steps, such as washing, following the reaction in the step E.

The reaction in the step G may be carried out in the presence of a catalyst, if necessary. Examples of catalysts used in the reaction include alkali metal salts such as sodium hydroxide, potassium hydroxide, potassium carbonate, and sodium carbonate; and quarternary ammonium salts (examples thereof are the same as those listed for the phase transfer catalyst used in the step A).

The amount of the glycidyl trialkylammonium salt used in the reaction in the step G is determined based on the molar ratio between the glycidyl trialkylammonium salt and hydroxyl groups in the polyalkyleneglycol chain-containing monomer represented by the formula (3) (in terms of hydroxyl value), and the molar ratio (hydroxyl group)/(glycidyl trialkylammonium salt) is preferably 5/1 to 1/5, more preferably 3/1 to 1/3, and further more preferably 1.5/1 to 1/1.5.

Each of the reactions in the steps A to G is preferably carried out in the absence of solvents since the reaction will effectively proceed and the volume efficiency will be better. However, the reactions may be carried out in the presence of a solvent. Any solvent may be used as long as it does not affect the reactions. Examples of solvents usable in the steps A, E, and G include hydrocarbons such as hexane, octane, decane, cyclohexane, benzene, and toluene; ethers such as diethylether, tetrahydrofuran, and dioxane; ketones such as acetone and methylethylketone; and chlorine-containing hydrocarbons such as dichloromethane and dichloroethane.

Examples of solvents usable in the steps B, C, D, and F include water; alcohols such as methanol, ethanol, and isopropanol; ethers such as diethylether, tetrahydrofuran, and dioxane; and ketones such as acetone and methylethylketone.

Any of these solvents may be used alone, or two or more of these may be used in combination.

The amount of the solvent used in each step is not particularly limited and is preferably 0.005 to 5 times, and more preferably 0.01 to 3 times larger than the amount of the polyalkyleneglycol chain-containing monomer represented by the formula (3) or the reaction product of the preceding step on a mass basis.

In the case that the phase transfer catalyst and the catalysts are used in the step A and the steps E and G, respectively, the amount of each catalyst is determined based on the molar ratio between the catalyst and hydroxyl groups in the polyalkyleneglycol chain-containing monomer represented by the formula (3) (in terms of hydroxyl value), and the molar ratio (hydroxyl group)/(catalyst) is preferably 1/0.0001 to 1/0.3, more preferably 1/0.001 to 1/0.2, and furthermore preferably 1/0.005 to 1/0.1. The catalyst at a ratio of less than the above range will not produce sufficient effect. The catalyst at a ratio of more than the above range will not produce the effect over a certain level and therefore is disadvantageous in terms of cost.

Preferably, the reaction temperature in each of the steps A to G is set so that stirring can be performed without difficulty. Specifically, the reaction temperature in each of the steps A to G is preferably 0° C. to 200° C., more preferably 15° C. to 150° C., and further more preferably 30° C. to 100° C.

The reaction time of each of the steps A to G is preferably 0.1 to 50 hours, more preferably 0.5 to 30 hours, and further more preferably 1 to 15 hours.

The reactions in the steps A to G may be carried out in an air or inert gas atmosphere under reduced, ambient or increased pressure.

In the case that the catalyst is used in the preceding step of each of the steps B, C, D, and F, the reactions in the steps B, C, D, and F may be carried out with the catalyst remaining in the reaction system.

Each of the steps B, C, D, E, F, and G may be a batch or continuous reaction step, and may be carried out in either of a tank or tube reactor.

The cationic group-containing monomer (A) is produced by any of the above-mentioned processes, and a purification step may be optionally performed. It is preferable to perform a purification step including extraction or washing since such a step reduces the amount of crosslinkable components that may cause gelation during polymerization.

The production processes (1) to (3) are preferably selected to produce the cationic group-containing monomer (A) among the production processes (1) to (4) because the production processes (1) to (3) are easy production methods in which low-cost materials are used.

The advantage of the production process (1) is to inhibit formation of crosslikable components that may cause gelation during polymerization. The advantage of the production process (2) is easiness of selection of the counteranion in the cationic group-containing monomer (A). The advantage of the production process (3) is less waste products produced in the reactions. The production process (1) is more preferable among these.

The counteranion in the cationic group-containing monomer (A) may be converted to a desired anion by an ion-exchange technique after the cationic group-containing monomer (A) is produced by any of the above production processes. However, an easy and preferable way to introduce a desirable anion is to appropriately select materials used in the production processes. Specifically, the anion in the tertiary amine salt used in the step (B) in the production process (1), the anion derived from the quaternizing agent in the step (D) in the production process (2), the halogen atom in the epihalohydrin in the step (E) in the production process (3), and the counteranion in the glycidyltrialkylammonium salt in the step (G) in the production process (4) are introduced as the counteranion in the cationic group-containing monomer (A).

<Carboxyl Group-Containing Monomer (B)>

The amphoteric polymer of the present invention contains the structure unit (b) derived from the carboxyl group-containing monomer (B).

The carboxyl group-containing monomer (B) is a monomer essentially containing 1) an unsaturated double bond and 2) a carboxyl group and/or a salt thereof. Specific examples thereof include unsaturated carboxylic acid-based monomers such as unsaturated monocarboxylic acids (e.g. acrylic acid, methacrylic acid, crotonic acid, α-hydroxyl acrylic acid, α-hydroxylmethylacrylic acid, derivatives of these), and salts of these; and unsaturated dicarboxylic acid-based monomers such as unsaturated dicarboxylic acids (e.g. itaconic acid, fumaric acid, maleic acid, citraconic acid, 2-methylene glutaric acid), and salts of these.

Any unsaturated dicarboxylic acid-based monomer may be used, provided that it contains an unsaturated group and two carboxyl groups in the molecular structure, and suitable examples thereof include maleic acid, itaconic acid, citraconic acid, and fumaric acid; monovalent metal salts, divalent metal salts, ammonium salts, and organic ammonium salts (organicamine salts) of the above acids; and anhydrides of the above examples.

Among these examples of the carboxyl group-containing monomer (B), acrylic acid, acrylates, maleic acid, and maleates are preferable because they remarkably improve the anti-soil redeposition ability of the resulting amphoteric polymer. It is more preferable to essentially use acrylic acid or an acrylate.

Suitable examples of salts of the unsaturated monocarboxylic acids and unsaturated dicarboxylic acids include metal salts, ammonium salts, and organic amine salts.

Examples of the metal salts include monovalent alkali metal salts such as sodium salts, lithium salts, and potassium salts; alkaline-earth metal salts such as magnesium salts and calcium salts; and salts of other metals such as aluminum salts and iron salts.

Examples of the organic amine salts include alkanolamine salts such as monoethanolamine salts, diethanolamine salts, and triethanolamine salts; alkylamine salts such as monoethylamine salts, diethylamine salts, and triethylamine salts; and organic amine salts such as polyamines including ethylenediamine salts and triethylenediamine salts.

Ammonium salts, sodium salts, and potassium salts are preferable among these because they remarkably improve the anti-soil redeposition ability of the resulting copolymer. Sodium salts are more preferable.

In addition to the above examples, examples of the carboxyl group-containing monomer (B) include half esters of unsaturated dicarboxylic acids and $C_{1-22}$ alcohols, half amides of unsaturated dicarboxylic acids and $C_{1-22}$ amines, half esters of unsaturated dicarboxylic acids and $C_{2-4}$ glycols, and half amides of maleamic acid and $C_{2-4}$ glycols.

In the structure unit (b) derived from the carboxyl group-containing monomer (B), the unsaturated double bond in the monomer (B) is converted to a single bond. The phrase "the amphoteric polymer of the present invention contains the structure unit (b) derived from the carboxyl group-containing monomer (B)" means that the final polymer product contains a structure unit in which the unsaturated double bond in the monomer (B) is converted to a single bond.

The structure units (b) in the amphoteric polymer of the present invention may all be of the same structure or may be of two or more different structures.

In the amphoteric polymer of the present invention, the structure unit (b) is present at a level of 1 to 99% by mass based on 100% by mass of all the structure units derived from all the monomers in the amphoteric polymer (i.e. the monomer units (a) and (b), and monomer unit(s) (e) described below). With the structure unit (b) at a level within this range, the polymer has strikingly improved anti-soil redeposition ability and compatibility with surfactants. The level of the structure unit (b) is preferably 10 to 95% by mass, more preferably 20 to 90% by mass, and furthermore preferably 30 to 85% by mass based on 100% by mass of all the structure units derived from all the monomers.

Owing to the structure unit (b) contained at a level within the above specific range, the amphoteric polymer of the present invention has good water solubility and produces the effect of dispersing soil particles in interaction with the structure unit (a) when used as a detergent builder.

In the present invention, when the mass ratio (% by mass) of the structure unit (b) derived from the carboxyl group-containing monomer (B) to all the structure units derived from all the monomers is calculated, the structure unit (b) is treated as the corresponding acid. In the case of the structure unit —$CH_2$—$CH(COONa)$— derived from sodium acrylate, the mass ratio (% by mass) of the structure unit derived from the corresponding acid acrylic acid, that is, the mass ratio (% by mass) of the structure unit —$CH_2$—$CH(COOH)$ is calculated. When the mass ratio (% by mass) of the carboxyl group-containing monomer (B) to all the monomers is calculated, the carboxyl group-containing monomer (B) is similarly treated as the corresponding acid. For example, to determine the mass ratio of sodium acrylate, the mass ratio (% by mass) of the corresponding acid acrylic acid is calculated instead.

<Other Monomer>

The amphoteric polymer of the present invention may contain structure unit(s) (e) derived from other monomer(s) (E) (monomers other than the cationic group-containing monomer (A) and carboxyl group-containing group (B)). The structure units (e) in the amphoteric polymer of the present invention may all be of the same structure or may be of two or more different structures.

The other monomer(s) (E) are not particularly limited, provided that they are copolymerizable with the monomers (A) and (B). The other monomer(s) (E) are appropriately selected to provide a desired effect. Specific examples thereof include quaternized vinyl aromatic compound-based monomers having a heterocyclic aromatic hydrocarbon group such as vinyl pyridine and vinyl imidazole; and amino group-containing monomers. Examples of the amino group-containing monomers include quaternized aminoalkyl (meth) acrylates such as dimethylaminoethylacrylate, dimethylaminoethylmethacrylate, dimethylaminopropyl acrylate, and aminoethyl methacrylate; quaternized allylamines such as diallylamine and diallyldimethylamine; quaternized monomers obtained by reacting tertiary amine salts with the epoxy rings of (meth) allyl glycidyl ether, isoprenyl glycidyl ether, vinyl glycidyl ether, and the like; quaternized allylamines such as diallylamine and diallyldimethylamine; quaternized monomers obtained by reacting secondary amines with the epoxy rings of (meth)allyl glycidyl ether, isoprenyl glycidyl ether, vinyl glycidyl ether, and the like, and by quaternizing the resulting monomers with known quaternizing agents; and quaternized amino (cationic) group-containing monomers other than the monomer (A).

Preferred examples of the secondary amines include dialkylamines such as dimethylamine, diethylamine, diisopropylamine, and di-n-butylamine; alkanolamines such as diethanolamine and diisopropanolamine; and cyclic amines such as morpholine and pyrrole. Examples of known quaternizing agents include alkyl halides and dialkyl sulfate. Specific examples of the tertiary amine salts include trimethylamine hydrochloride and triethylamine hydrochloride. These salts may be hydrochlorides, organic acid salts, and the like.

In addition to the above examples, specific examples of the other monomer(s) (E) include sulfonic acid group-containing monomers such as vinylsulfonic acid, (meth) allyl sulfonic acid, isoprenesulfonic acid, 3-allyloxy-2-hydroxypropanesulfonic acid, and acrylamido-2-methylpropanesulfonic acid, and salts of these; polyalkyleneglycol chain-containing monomers such as (meth)acrylates of alkoxy alkylene glycols, and monomers obtained by adding alkylene oxides to (meth)allyl alcohol, isoprenol and the like; N-vinyl monomers such as N-vinylpyrrolidone, N-vinylformamide, N-vinylacetamide, N-vinyl-N-methylformamide, N-vinyl-N-methylacetamide, and N-vinyloxazolidone; amide-containing monomers such as (meth)acrylamide, N,N-dimethylacrylamide, and N-isopropylacrylamide; hydroxyl group-containing monomers such as (meth)allyl alcohol and isoprenol; alkyl (meth)acrylate-based monomers such as butyl (meth) acrylate, 2-ethylhexyl(meth)acrylate, and dodecyl(meth) acrylate; hydroxyalkyl (meth)acrylate-based monomers such as hydroxyethyl(meth)acrylate, 2-hydroxyethyl(meth)acrylate, hydroxybutyl(meth)acrylate, 2-hydroxybutyl(meth) acrylate, 4-hydroxybutyl(meth)acrylate, α-hydroxymethylethyl(meth)acrylate, hydroxypentyl(meth)acrylate, hydroxyneopentyl(meth)acrylate, and hydroxyhexyl(meth) acrylate; vinylaryl monomers such as styrene, indene, and vinylaniline; and other monomers such as isobutylene, and vinyl acetate.

In the structure unit(s) (e) derived from the other monomer(s) (E), the double bond in the other monomer(s) (E) is converted to a single bond. The phrase "the amphoteric polymer of the present invention contains the structure unit(s) (e) derived from the other monomer(s) (E)" means that the final polymer product contains structure unit(s) in which the unsaturated double bond in the monomer(s) (E) is converted to a single bond.

In the case that the amphoteric polymer of the present invention contains the optional structure unit(s) (e) derived from the other monomer(s) (E), the structure unit(s) (e) are preferably present at a level of 0 to 60% by mass based on 100% by mass of all the monomer units derived from all the monomers (100% by mass of the monomer units (a), (b) and (e)), and more preferably 0 to 50% by mass of all the monomer units.

When the mass ratio of a structure unit derived from an amino group-containing monomer to all the structure units derived from all the monomers, and the mass ratio of the amino group-containing monomer to all the monomers are calculated, the structure unit and the monomer are treated as the corresponding unneutralized amine. For example, in the case that the other monomer (E) is vinylamine hydrochloride, the mass ratio (% by mass) of its corresponding unneutralized amine, that is, vinylamine is calculated instead.

The mass ratios (% by mass) of quaternized amino group-containing monomers and structure units derived from the quaternized amino group-containing monomers are calculated without counting the mass of counteranion.

When the structure unit (e) is a structure unit derived from an acid group-containing monomer, the mass ratio (% by mass) of the structure unit (e) to all the structure units derived from all the monomers is calculated by treating the structure unit as the corresponding acid. The mass ratio (% by mass) of the acid group-containing monomer to all the monomers is also calculated by treating the monomer as the corresponding acid.

<Other Characteristic and Property of Amphoteric Polymer>

In the amphoteric polymer of the present invention, the structure units (a) and (b) are introduced at specific levels, and the structure unit(s) (e) are optionally introduced at a specific level, as described above. These structure units may be arranged in either a random or block fashion.

The weight average molecular weight of the amphoteric polymer of the present invention is not particularly limited and can be appropriately selected. Specifically, the amphoteric polymer has a weight average molecular weight preferably in the range of from 2,000 to 200,000, more preferably in the range of from 3,000 to 100,000, and further more preferably 4,000 to 60,000. With weight average molecular weights in this range, the anti-soil redeposition ability is likely to be improved.

The weight average molecular weight used herein is determined by GPC (gel permeation chromatography) and can be determined with the device under the measurement conditions described in Examples below.

The amphoteric polymer of the present invention has high anti-soil redeposition ability. The anti-soil redeposition ratio of the amphoteric polymer is preferably not less than 76.3%, more preferably 76.5%, and further more preferably 77.0%.

The anti-soil redeposition ratio can be measured by the procedure described in Examples below.

(Amphoteric Polymer Composition)

The amphoteric polymer of the present invention may be present with other components in an amphoteric polymer composition. Examples of components other than the amphoteric polymer include residues of polymerization initiators, residual monomers, by-products of polymerization, and water. Such an amphoteric polymer composition may contain one or more of these components. The amphoteric polymer of the present invention is preferably present at a level of 1 to 100% by mass based on 100% by mass of the whole amphoteric polymer composition. A preferred example of the amphoteric polymer composition is an amphoteric polymer composition containing 40 to 60% by mass of the amphoteric polymer of the present invention and 40 to 60% by mass of water.

(Process for Producing Amphoteric Polymer of the Present Invention)

In the process for producing the polyalkylene glycol-based polymer of the present invention, monomers can be polymerized by following a known polymerization method or a modified method thereof unless otherwise specified. For example, the amphoteric polymer of the present invention is produced by copolymerizing monomers including (i) the cationic group-containing monomer (A) (monomer (A)) and (ii) the carboxyl group-containing monomer (B) (monomer (B)), and optionally including other monomer(s) (E) (monomer(s) (E)).

Specific examples of polymerization methods include water-in-oil emulsion polymerization, oil-in-water emulsion polymerization, suspension polymerization, dispersion polymerization, precipitation polymerization, solution polymerization, aqueous solution polymerization, and bulk polymerization. Among these polymerization methods, aqueous solution polymerization and emulsion polymerization are preferable because they are highly safe methods and require only low production cost (polymerization cost). In such a production process, polymerization initiators can be used to copolymerize the monomers.

In the process for producing the amphoteric polymer of the present invention, the ratios of the monomers used in polymerization to all the monomers (monomers (A), (B), and (E)) are as follows: the monomer (A) is used at a level of 1 to 99% by mass based on 100% by mass of all the monomers; the monomer (B) is used at a level of 1 to 99% by mass based on 100% by mass of all the monomers; and the monomers (E) may be present at a level of 0 to 60% by mass based on 100% by mass of all the monomers (monomers (A), (B), and (E)). The monomer (A) is preferably used at a level of 5 to 90% by mass, more preferably at a level of 10 to 80% by mass, and further more preferably 15 to 70% by mass. The monomer (B) is preferably used at a level of 10 to 95% by mass, more preferably at a level of 20 to 90% by mass, and further more preferably at a level of 30 to 85% by mass.

<Polymerization Initiator>

In the production process, polymerization initiators known in the art may be used. Specifically, suitable examples thereof include hydrogen peroxide; persulfates such as sodium persulfate, potassium persulfate, and ammonium persulfate; azo compounds such as 2,2'-azobis(2-amidinopropane) hydrochloride, 4,4'-azobis-4-cyanovaleric acid, azobis isobutyronitrile, and 2,2'-azobis(4-methoxy-2,4-dimethylvaleronitrile); and organic peroxides such as benzoyl peroxide, lauroyl peroxide, peracetic acid, di-t-butyl peroxide, and cumene hydroperoxide. Hydrogen peroxides, persulfates, 2,2'-azobis(2-amidinopropane) hydrochloride are preferable among these polymerization initiators, and persulfates, 2,2'-azobis(2-amidinopropane) hydrochloride are more preferable. Any of these polymerization initiators may be used alone, or a mixture of two or more of these may be used.

<Chain Transfer Agent>

In the process for producing the amphoteric polymer of the present invention, chain transfer agents may be optionally used, as molecular weight controlling agents for the polymer, in an amount within a range of not affecting the polymerization. Specific examples of chain transfer agents include thiol-based chain transfer agents such as mercaptoethanol, thioglycerol, thioglycolic acid, 2-mercaptopropionic acid, 3-mercaptopropionic acid, thiomalic acid, octylthioglycolate, octyl 3-mercaptopropionate, 2-mercaptoethanesulfonic acid, n-dodecyl mercaptan, octyl mercaptan, and butyl thioglycolate; halides such as carbon tetrachloride, methylene chloride, bromoform, and bromotrichloroethane; secondary alcohols such as isopropanol and glycerin; and lower oxides and salts thereof such as phosphorous acid, hypophosphorous acid, salts of hypophosphorous acid (e.g. sodium hypophosphite, potassium hypophosphite), and sulfurous acid, hydrogen sulfurous acid, dithioic acid, metabisulfurous acid, and salts of these (e.g. sodium hydrogen sulfite, potassium hydrogen sulfite, sodium dithionite, potassium dithionite, sodium metabisulfite, potassium metabisulfite). Any of these chain transfer agents may be used alone, or a mixture of two or more of these may be used.

The use of chain transfer agents advantageously prevents the molecular weight of the resulting polymer from increasing over a certain level and therefore results in more efficient production of a low-molecular weight amphoteric polymer.

In the process for producing the amphoteric polymer of the present invention, sulfurous acid and/or sulfites (hereinafter, also referred to as "sulfurous acid(sulfite(s))") are preferably used as chain transfer agents. In this case, sulfurous acid (sulfite(s)) are used in combination with polymerization initiators. Heavy metal ions may also be used as reaction accelerators, which are described later.

The term "sulfurous acid (sulfite(s))" is intended to include sulfurous acid, hydrogen sulfurous acid, and salts of these. Among these, salts of sulfurous acid and hydrogen sulfurous acid are suitable. Suitable examples of salts of sulfurous acid and hydrogen sulfurous acid include metal salts, ammonium salts, and organic ammonium salts, in addition to the above examples.

Preferred examples of the metals include monovalent alkali metals such as lithium, sodium, and potassium; divalent alkaline-earth metals such as calcium and magnesium; and trivalent metals such as aluminum and iron.

Suitable examples of organic ammoniums (organic amines) include alkanolamines such as ethanolamine, diethanolamine, and triethanolamine; and triethylamine. Other examples of the sulfites include ammonium sulfites.

Accordingly, preferred examples of sulfites used in the present invention include sodium hydrogen sulfite, potassium hydrogen sulfite, ammonium hydrogen sulfite, sodium sulfite, potassium sulfite, and ammonium sulfite. Sodium hydrogen sulfite is particularly suitable. Any of these sulfurous acid (sulfites) may be used alone, or a mixture of two or more of these may be used.

<Reaction Accelerator>

In the process for producing the amphoteric polymer of the present invention, reaction accelerators may be added to reduce the amount of agents used in the reaction such as initiators. Examples of reaction accelerators include heavy metal ions. The term "heavy metal ions" used herein is intended to include metals having a specific gravity of not less than 4 g/cm$^3$. Preferred examples of metal ions includes ions of iron, cobalt, manganese, chromium, molybdenum, tungsten, copper, silver, gold, lead, platinum, iridium, osmium, palladium, rhodium, and ruthenium. Any of these heavy metals may be used alone, or two or more of these may be used in combination. Among these, iron is more preferable. The ionic valency of the heavy metal ions is not particularly limited. For example, when iron is used as a heavy metal, the initiator may include iron in the $Fe^{2+}$ form, or $Fe^{3+}$ form, or may contain iron in both forms.

The heavy metal ions may be used in any forms, provided that they are present in ion forms. For handleability, the heavy metals are preferably used in solution forms obtained by dissolving heavy metal compounds. The heavy metal compounds are any compounds, provided that they contain a desired heavy metal that is to be captured in initiators. The heavy metal compounds can be selected according to initiators used in combination. When iron is selected as the heavy metal ion, preferred examples of heavy metal compounds include Mohr's salt $(Fe(NH_4)_2(SO_4)_2.6H_2O)$, ferrous sulfate heptahydrate, ferrous chloride, and ferric chloride. When manganese ion is selected as the heavy metal ion, manganese chloride or the like is suitably used. All of these are water-soluble compounds and therefore are used in aqueous solution forms and easy to handle. Solvents used for solutions containing the heavy metal compounds dissolved therein are not limited to water, provided that they dissolve the heavy metal compounds and will never inhibit the polymerization reaction in the process for producing the amphoteric polymer of the present invention.

The heavy metal ions may be added in any manner and are preferably added all before the completion of addition of the monomers, and are more preferably charged all at once at the start of the reaction. The amount of heavy metal ions is preferably not more than 100 ppm per the total amount of the reaction liquid, more preferably not more than 70 ppm, further more preferably not more than 50 ppm, and still further more preferably 30 ppm. Undesirably, addition of more than 100 ppm of heavy metal ions will not produce further effects and may provide highly colored polymers which are not suitable for use as detergent additives and the like.

The level of heavy metal ions is preferably 0.1 to 10 ppm in the total mass of the polymerization reaction liquid at the completion of the polymerization reaction. With less than 0.1 ppm of heavy metal ions, a sufficient effect may not be provided. With more than 10 ppm of heavy metal ions, the color tone of the resulting polymer will be deteriorated. Furthermore, polymers produced with too much heavy metal ions may cause colored soils when used as detergent builders.

The term "at the completion of the polymerization" means the time when the polymerization reaction in the polymerization reaction liquid substantially ends such that the desired polymer is provided. For example, when the polymer produced in the polymerization reaction liquid is neutralized with an acid component, the mass of the heavy metal ions is determined based on the total amount of the polymerization reaction liquid after the neutralization. In the case that two or more heavy metal ions are contained, the total amount of heavy metal ions are within the above range.

In the process for producing the amphoteric polymer of the present invention, other compounds such as catalysts for decomposing polymerization initiators and reducing compounds may be added in the reaction system upon the polymerization reaction in addition to the above-mentioned compounds.

Examples of catalysts for decomposing polymerization initiators include halogenated metals such as lithium chloride and lithium bromide; metal oxides such as titanium oxide and silica dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, and benzoic acid, and esters and metal salts thereof; heterocyclic amines such as pyridine, indole, imidazole, and carbazole, and derivatives thereof. Any of these decomposition catalysts may be used alone, or two or more of these may be used in combination.

Examples of reducing compounds include organic metal compounds such as ferrocene; inorganic compounds capable of generating metal ions (e.g. iron, copper, nickel, cobalt, manganese ions) such as iron naphthenate, copper naphthenate, nickel naphthenate, cobalt naphthenate, and manganese naphthenate; inorganic compounds such as ether adducts of boron trifluoride, potassium permanganate, and perchloric acid; sulfur-containing compounds such as sulfur dioxide, sulfites, sulfates, bisulfites, thiosulfates, sulfoxylates, benzene sulfinic acid and substituted compounds thereof, and analogues of cyclic sulfinic acid such as p-toluene sulfinic acid; mercapto compounds such as octyl mercaptan, dodecyl mercaptan, mercapto ethanol, α-mercaptopropionic acid, thioglycolic acid, thiopropionic acid, sodium α-thiopropionate sulfopropylester, and sodium α-thiopropionate sulfoethylester; nitrogen-containing compounds such as hydrazine, β-hydroxyethylhydrazine, and hydroxylamine; aldehydes such as formaldehyde, acetaldehyde, propionaldehyde, n-butyladehyde, isobutylaldehyde, and isovalerianaldehyde; and ascorbic acid. Any of these reducing compounds may be used alone, or two or more of these may be used in combination. Some of the reducing compounds including mercapto compounds can be used as chain transfer agents.

The combination of chain transfer agents, initiators, and reaction accelerators is not particularly limited, and each of them can be suitably selected from the above examples. Preferred examples of the combination of chain transfer agents, initiators, and reaction accelerators include sodium hydrogen sulfite/hydrogen peroxide, sodium hydrogen sulfite/sodium persulfate, sodium hydrogen sulfite/Fe (ion), sodium hydrogen sulfite/hydrogen peroxide/Fe (ion), sodium hydrogen sulfite/sodium persulfate/Fe (ion), sodium hydrogen sulfite/sodium persulfate/hydrogen peroxide, and sodium hydrogen sulfite/oxygen/Fe (ion). Among these, sodium persulfate/hydrogen peroxide, sodium persulfate/hydrogen peroxide/Fe (ion), sodium hydrogen sulfite/sodium persulfate, sodium hydrogen sulfite/sodium persulfate/Fe (ion) are more preferable, and sodium hydrogen sulfite/sodium persulfate/Fe (ion), and sodium persulfate/hydrogen peroxide/Fe (ion) are further more preferable.

<Amount of Polymerization Initiator and Other Agent>

The amount of polymerization initiators is not particularly limited, provided that it is enough to initiate copolymerization of the monomers. The amount of polymerization initiators is preferably not more than 15 g per mol of all the monomers (monomers (A), (B), and (E)), and more preferably 1 to 12 g.

When hydrogen peroxide is used as an initiator, the amount of hydrogen peroxide is preferably 1.0 to 10.0 g, and more preferably 2.0 to 8.0 g per mol of all the monomers. Addition of less than 1.0 g of hydrogen peroxide is likely to increase the weight average molecular weight of the resulting copolymer. On the other hand, addition of more than 10.0 g will no longer produce an effect proportional to the added amount and cause disadvantages such as a large amount of remaining hydrogen peroxide.

When a persulfate is used as an initiator, the amount of the persulfate is preferably 1.0 to 5.0 g, and more preferably 2.0 to 4.0 g per mol of all the monomers. The use of the persulfate in an amount less than the above range is likely to increase the molecular weight of the resulting copolymer. On the other hand, addition of more than the above range will no longer produce an effect proportional to the added amount and cause disadvantages such as low purity of the resulting copolymer.

When hydrogen peroxide and a persulfate are used in combination as initiators, the ratio of hydrogen peroxide and the persulfate to be added is determined by the mass ratio of the persulfate to hydrogen peroxide. The mass ratio is preferably 0.1 to 5.0, and more preferably 0.2 to 2.0. The use of the persulfate at a mass ratio of less than 0.1 is likely to increase the weight average molecular weight of the resulting copolymer. On the other hand, addition of the persulfate at amass ratio of more than 5.0 will no longer produce a molecular weight reducing effect proportional to the added amount, and therefore the persulfate will be wasted in the polymerization reaction system.

It is preferable to almost continuously add dropwise hydrogen peroxide in an amount not less than 85% by weight of the predetermined required amount. The amount is more preferably not less than 90% by weight, and further more preferably 100% by weight (i.e. hydrogen peroxide is preferably all added dropwise). In the case that hydrogen peroxide is continuously added dropwise, the drop rate may be changed.

It is preferable to start drop-wise addition of hydrogen peroxide after a certain time period from the start of drop-wise addition of the monomers (other than monomers charged at the start of the reaction) when the reaction is carried out under suitable reaction conditions described below (e.g. temperature, pressure, pH). Specifically, hydrogen peroxide is preferably added after not less than one minute from the start of drop-wise addition of the cationic group-containing monomer (A), more preferably not less than three minutes from the start, further more preferably not less than five minutes after the start, and still furthermore preferably not less than ten minutes after the start of drop-wise addition of the monomer (A). The time period before the start of drop-wise addition of hydrogen peroxide allows smooth initiation of the polymerization at the initial stage, which in turn leads to a narrow molecular weight distribution.

The time period before the start of drop-wise addition of hydrogen peroxide is preferably not more than 60 minutes, more preferably not more than 30 minutes from the start of drop-wise addition of the monomers.

However, drop-wise addition of hydrogen peroxide may be simultaneously started with drop-wise addition of the monomers, or a portion of hydrogen peroxide may be charged in the reaction system before the start of drop-wise addition of the monomers.

When a portion of hydrogen peroxide is charged in the reaction system in advance, the portion is preferably not more than 10% of the predetermined required amount, more preferably not more than 7%, further more preferably not more than 5%, and still further more preferably not more than 3%.

If hydrogen peroxide in an amount of more than 10% of the predetermined desired amount is added together with, for example, a persulfate to the reaction system before the start of drop-wise addition of the monomers, the concentration ratio of hydrogen peroxide to the persulfate is large, and therefore the polymerization will stop. If hydrogen peroxide is added after more than 60 minutes from the start of drop-wise addition of the monomers, reactions such as a chain transfer reaction by hydrogen peroxide will not initiate. As a result, polymers produced at an initial stage of the polymerization will have large molecular weights.

Preferably, drop-wise addition of hydrogen peroxide is completed simultaneously with the completion of drop-wise addition of the monomers when the reaction is carried out under the suitable reaction conditions described below (e.g. temperature, pressure, pH). Addition of hydrogen peroxide is more preferably completed not less than 10 minutes, and further more preferably not less than 30 minutes before the completion of drop-wise addition of the monomers. Even if drop-wise addition of hydrogen peroxide is completed after the completion of drop-wise addition of the monomers, the polymerization system does not suffer from any disadvantages. However, portion of added hydrogen peroxide remains undecomposed at the completion of polymerization. Unreacted hydrogen peroxide does not produce the effect and is used in vain. If a large amount of hydrogen peroxide remains, remaining hydrogen peroxide disadvantageously affects the thermal stability of the resulting polymer.

The persulfate may be added in any manner. Considering the characteristics such as decomposability, it is preferable to almost continuously add dropwise the persulfate in an amount of not less than 50% by mass of the predetermined required amount. The amount is more preferably not less than 80% by mass, and further more preferably 100% by mass (i.e. the persulfate is preferably all added dropwise). In the case that the persulfate is continuously added dropwise, the drop rate may be changed.

The drop-wise addition time is also not particularly limited. Since the persulfate is an initiator to be decomposed in a comparatively short time when the reaction is carried out under the suitable reaction conditions described below (e.g. temperature, pressure, pH), it is preferable to continue drop-wise addition of the persulfate until the completion of drop-wise addition of the monomers. It is more preferable to complete drop-wise addition of the persulfate within 30 minutes after the completion of drop-wise addition of the monomers, and is more preferable to complete the addition within 5 to 20 minutes after drop-wise addition of the monomers. Through such operation, the amount of residual monomers in the resulting polymer composition can be strikingly reduced.

Even if drop-wise addition of the initiators is completed before the completion of drop-wise addition of the monomers, the polymerization reaction does not suffer from any disadvantages. The timing of the completion of drop-wise addition of the initiators can be determined according to the amount of residual monomers in the resulting copolymer composition.

For initiators which are decomposed in a comparatively short time, such as persulfates, the completion timing of drop-wise addition is described above, and the starting timing thereof is not particularly limited and is appropriately determined. For example, drop-wise addition of such an initiator may be started before drop-wise addition of the monomers. When two or more of such initiators are used in combination, a certain time after the start of drop-wise addition of one of the initiators or after the completion of drop-wise addition of the initiator, drop-wise addition of the other initiator(s) may be started. In each case, the starting timing of drop-wise addition of initiators can be suitably determined according to the decomposition speed of the initiators and the reactivity of the monomers.

In the case that a polymerization initiator is added drop-wise, the concentration of the initiator solution is not particularly limited and is preferably 5 to 60% by weight, and more preferably 10 to 50% by weight. Initiator concentrations of less than 5% by weight mean strikingly low concentrations of the monomers in the polymerization reaction system. In these cases, the polymerizability of the monomers will be strikingly low, and a remarkably large portion of the monomers will remain in the resulting copolymer composition. Such solutions are disadvantageous in terms of cost because of their low transportation efficiency and productivity. Concentrations of more than 60% by weight are disadvantageous in terms of safety and handleablilty upon drop-wise addition.

The amount of chain transfer agents is not particularly limited, provided that it is determined so that the monomers (A), (B), and (E) are allowed to polymerize well. The amount of chain transfer agents is preferably 1 to 20 g, and more preferably 2 to 15 g per mol of all the monomers (monomers (A), (B), and (E)). With less than 1 g of chain transfer agents, the molecular weight of the resulting polymer cannot be controlled. The use of more than 20 g of chain transfer agents may result in formation of large amounts of impurities and therefore lead to low purity of the resulting polymer. Especially, when a sulfite is used, excess sulfite is decomposed in the reaction system, which may disadvantageously result in generation of sulfur dioxide. In addition, the use of more than 20 g of chain transfer agents is disadvantageous in terms of cost.

The more preferred combination of initiators and chain transfer agents is one or more of persulfates and one or more of sulfites. In this case, the blending ratio between the persulfate(s) and the sulfite(s) is not particularly limited. Preferably, 0.5 to 5 parts by mass of the sulfite(s) are used with respect to 1 part by mass of the persulfate(s). The lower limit of the amount of the sulfite(s) is more preferably 1 part by mass, and is further more preferably 2 parts by mass with respect to 1 part by mass of the persulfate (s). The upper limit of the amount of the sulfite(s) is more preferably 4 parts by mass, and furthermore preferably 3 parts by mass with respect to 1 part by mass of the persulfate(s). If less than 0.5 parts by mass of the sulfate(s) are used with respect to 1 part by mass of the persulfate(s), the total initiator amount required to produce a lower-molecular weight polymer will increase. On the other hand, the use of more than 5 parts by weight of the sulfite(s) will increase side reactions and therefore increase impurities produced in the side reactions.

The total amount of chain transfer agents, initiators, and reaction accelerators is preferably 2 to 20 g per mol of all the monomers (A), (B), and (E). The use of them within this range enables the amphoteric polymer of the present invention to be efficiently produced and controls the molecular weight distribution of the amphoteric polymer within a desired range. The total amount of them is more preferably 4 to 18 g, and further more preferably 6 to 15 g.

<Polymerization Solvent>

In the process for producing the amphoteric polymer of the present invention, the monomers (A), (B), and (E) are preferably copolymerized in a solvent in which the monomers (A), (B), and (E) can dissolve. It is preferable to use a solvent containing not less than 50% by mass of water.

In some cases depending on usage, the amphoteric polymer should be free from contamination of organic solvents. The use of a solvent containing not less than 50% by mass of water is advantageous in that the amount of an organic solvent used in the polymerization reaction is suppressed and therefore the organic solvent is easily removed after the completion of polymerization.

Examples of solvents used with water include lower alcohol such as methanol, ethanol, and isopropyl alcohol; lower ketones such as acetone, methyl ethyl ketone, and diethyl ketone; ethers such as dimethyl ether and dioxane; and amides such as dimethyl formaldehyde. Any of these solvents may be used alone, or a mixture of two or more of these may be used.

From the above-mentioned viewpoint, water is preferably used at a level of 80% by mass based on 100% by mass of the whole solvent to be used, and more preferably 100% by mass (i.e. the solvent is water.) When organic solvents are added, for solubility of the monomers and the resulting polymer, it is preferable to use one or more solvents selected from lower $C_{1-4}$ alcohols with water.

The amount of the solvent such as water is preferably 40 to 200% by mass per 100% by mass of all the monomers. The lower limit thereof is more preferably 45% by mass, further more preferably 50% by mass, and the upper limit thereof is more preferably 180% by mass, and further more preferably 150% by mass. The copolymer produced under the presence of the solvent at a level of less than 40% by mass may have high molecular weight.

With the solvent at a level of more than 200% by mass, the concentration of the resulting copolymer in the reaction system will be low, and therefore a step for removing the solvent may be required in some cases. A portion or the whole of the solvent may be charged in a reaction vessel at an initial stage of polymerization, and a portion of the solvent may be added (dropwise) in the reaction system during the polymerization reaction. Alternatively, the monomers and agents such as initiators may be dissolved in the solvent and the obtained solution containing these components may be added (dropwise) to the reaction system in the polymerization reaction.

In the production process, the monomers, initiators, and chain transfer agents may be added in a reaction vessel by continuous addition such as drop-wise addition and portion-wise addition. Each of them may be separately charged in the reaction vessel, or may be mixed with other materials or in a solvent or the like in advance. Specifically, these materials may be added by methods such as a method including charging all the monomers into the reaction vessel and adding polymerization initiators to copolymerize the monomers; a method including charging a portion of the monomers into the reaction vessel, and adding polymerization initiators and the residual monomers continuously or portionwise (preferably, continuously) to the reaction vessel to copolymerize the monomers; and a method including charging a polymerization solvent into the reaction vessel, and adding all the monomers and polymerization initiators. Among these methods, the method including successively adding dropwise polymerization initiators and the monomers into the reaction vessel and copolymerizing the monomers is preferable because it provides copolymers having a narrow (sharp) molecular weight distribution and improves the dispersability of soils and anti-soil redeposition ability. Polymerization may be batchwise polymerization or continuous polymerization.

<Polymerization Condition>

In the above production process, the polymerization conditions such as polymerization temperature are appropriately determined based on factors such as the polymerization method, solvents, and polymerization initiators. The polymerization temperature is preferably not lower than 0° C., and not higher than 150° C. The lower limit thereof is more preferably 40° C., furthermore preferably 60° C., and still further more preferably 80° C. The upper limit thereof is more preferably 120° C., and further more preferably 110° C.

Particularly, in the case of using sulfurous acid (sulfite(s)), the polymerization temperature is preferably 60° C. to 95° C., more preferably 70° C. to 95° C., and further more preferably 80° C. to 95° C. At temperatures lower than 60° C., a large amount of impurities derived from sulfurous acid (sulfite(s)) will generate. At temperatures higher than 95° C., harmful sulfur dioxide will be emitted.

The polymerization temperature is not necessarily kept almost constant throughout the polymerization reaction, and the temperature may be set at room temperature at the start of the polymerization reaction, increased to a set temperature at an appropriate temperature rising rate or over an appropriate temperature rising time, and then kept at the set temperature. Alternatively, the temperature may be altered (increased or decreased) with a lapse of time during the polymerization reaction depending on the drop-wise addition method for the monomers, initiators, and the like.

The polymerization time is not particularly limited, and preferably 30 to 420 minutes, more preferably 45 to 390 minutes, further more preferably 60 to 360 minutes, and still further more preferably 90 to 300 minutes. The term "polymerization time" used herein means a time in which the monomers are being added, that is, a time from the start to the end of addition of the monomers.

The pressure in the reaction system in the polymerization method may be any of normal pressure (atmospheric pressure), reduced pressure, and increased pressure. In order to suitably control the molecular weight of the resulting copolymer, it is preferable that the reaction is carried out under normal pressure, or that the reaction system is sealed and the reaction is carried out under increased pressure. The advantage of normal pressure (atmospheric pressure) is that equipment such as pressuring and depressurizing devices, a pressure-resistant reaction vessel and pipes is not required.

The atmosphere in the reaction system may be air atmosphere but is preferably an inert gas atmosphere. It is preferable, for example, to replace the air in the system with an inert gas such as nitrogen before the start of polymerization.

In the above polymerization method, the pH during the polymerization reaction is not particularly limited. When a bisulfite is used as a chain transfer agent, the reaction is preferably carried out under an acidic condition.

[Usage of Amphoteric Polymer of the Present Invention and Amphoteric Polymer Composition]

The amphoteric polymer of the present invention (or amphoteric polymer composition) can be used as a coagulant, flocculating agent, printing ink, adhesive, soil control (modification) agent, fire retardant, skin care agent, hair care agent, additive for shampoos, hairsprays, soaps, and cosmetics, anion exchange resin, dye mordant, and auxiliary agent for fibers and photographic films, pigment spreader for paper making, paper reinforcing agent, emulsifier, preservative, softening agent for textiles and paper, additive for lubricants, water treatment agent, fiber treating agent, dispersant, additive for detergents, scale control agent (scale depressant), metal ion sealing agent, viscosity improver, binder of any type, emulsifier, and the like. When used as a detergent builder, the amphoteric polymer of the present invention (or amphoteric polymer composition) can be added to detergents for various usages such as detergents for clothes, tableware, cleaning, hair, bodies, tooth brushing, and vehicles.

<Water Treatment Agent>

The amphoteric polymer of the present invention (or amphoteric polymer composition) can be used in water treatment agents. When used in water treatment agents, the amphoteric polymer of the present invention (or amphoteric polymer composition) may be provided as a composition formulated with polyphosphates, phosphates, anti-corrosion agents, slime control agents, and chelating agents, if necessary.

Such water treatment agents are useful for scale inhibition of cooling water circulation systems, boiler water circulation systems, seawater desalination plants, pulp digesters, black liquor condensing kettles and the like. In addition, any suitable water soluble polymer may be included within a range of not affecting the performance or effect of this polymer.

<Fiber Treating Agent>

The amphoteric polymer of the present invention (or amphoteric polymer composition) can be used in fiber treating agents. Such fiber treating agents contain the amphoteric polymer of the present invention (or amphoteric polymer composition) and at least one selected from the group consisting of dyeing agents, peroxides, and surfactants.

In fiber treating agents, the amphoteric polymer of the present invention preferably constitutes 1 to 100% by weight, and more preferably 5 to 100% by weight of the total amount. In addition, any suitable water soluble polymer may be included within a range of not affecting the performance or effect of this polymer.

An example of the composition of such a fiber treating agent is described below. The fiber treating agent can be used in steps of scouring, dyeing, bleaching and soaping in fiber treatment. Examples of dyeing agents, peroxides, and surfactants include those commonly used in fiber treating agents.

The blending ratio between the amphoteric polymer of the present invention and at least one selected from the group consisting of dyeing agents, peroxides, and surfactants is determined based on the amount of the purity-converted fiber treating agent per part by weight of the polymer of the present invention. In a suitable example of a composition that is used as a fiber treating agent to provide improved degree of whiteness, color uniformity, and dyeing fastness of textiles, at least one selected from the group consisting of dyeing agents, peroxides, and surfactants is preferably used at a ratio of 0.1 to 100 parts by weight per part by weight of the amphoteric polymer of the present invention.

The fiber treating agent can be used for any suitable fibers including cellulosic fibers such as cotton and hemp, synthetic fibers such as nylon and polyester, animal fibers such as wool and silk thread, semisynthetic fibers such as rayon, and textiles and mixed products of these.

For a fiber treating agent used in a scouring step, an alkali agent and a surfactant are preferably used with the amphoteric polymer of the present invention. For a fiber treating agent used in a bleaching step, a peroxide and a silicic acid-containing agent such as sodium silicate as a decomposition inhibitor for alkaline bleaches are preferably used with the amphoteric polymer of the present invention.

<Inorganic Pigment Dispersant>

The amphoteric polymer of the present invention (or amphoteric polymer composition) can be used in inorganic pigment dispersants. When used in inorganic pigment dispersants, the amphoteric polymer of the present invention (or amphoteric polymer composition may be provided as a composition formulated with condensed phosphoric acid and salts thereof, phosphonic acid and salts thereof, and polyvinyl alcohol, if necessary.

In inorganic pigment dispersants, the amphoteric polymer of the present invention preferably constitutes 5 to 100% by weight of the total amount. In addition, any suitable water soluble polymer may be included within a range of not affecting the performance or effect of this polymer.

Such inorganic pigment dispersants produce good performance as inorganic pigment dispersants for heavy or light calcium carbonate and clay used for paper coating. For example, by adding such an inorganic pigment dispersing agent in a small amount to inorganic pigments and dispersing them into water, a highly concentrated inorganic pigment slurry such as a high concentrated calciumcarbonate slurry having low viscosity, high fluidity, and excellent temporal stability of these properties can be produced.

When such an inorganic pigment dispersant is used as a dispersant for inorganic pigments, the amount of the inorganic pigment dispersant is preferably 0.05 to 2.0 parts by weight per 100 parts by weight of pigments. The use of the inorganic pigment dispersant in an amount within the above range provides a sufficient dispersion effect proportional to the added amount and is advantageous in terms of cost.

<Detergent Builder>

The amphoteric polymer of the present invention (or amphoteric polymer composition) can be also used as a detergent builder. The detergent builder can be added to detergents for various usages such as detergents for clothes, tableware, cleaning, hair, bodies, toothbrushing, and vehicles.

<Detergent Composition>

The amphoteric polymer of the present invention (or amphoteric polymer composition) can be also used in detergent compositions.

In detergent compositions, the amount of the amphoteric polymer is not particularly limited, and the amphoteric polymer is preferably used at a level of 0.1 to 15% by mass, more preferably 0.3 to 10% by mass, and further more preferably 0.5 to 5% by mass based on 100% by mass of the total amount. At levels within this range, the amphoteric polymer provides excellent detergent builder performance.

Detergent compositions used for washing typically contain surfactants and additives which are commonly used in detergents. Such surfactants and additives are not particularly limited and are appropriately selected based on common knowledge in the field of detergents. The detergent compositions may be in the form of a powder or liquid.

One or more surfactants selected from the group consisting of anionic surfactants, nonionic surfactants, cationic surfactants, and amphoteric surfactants are used.

When two or more of them are used in combination, the total amount of anionic surfactant(s) and nonionic surfactant(s) is preferably not less than 50% by mass, more preferably not less than 60% by mass, further more preferably not less than 70% by mass, and still further more preferably not less than 80% by mass based on 100% by mass of all the surfactants.

Suitable examples of anionic surfactants include alkylbenzene sulfonates, alkylether sulfates, alkenylether sulfates, alkyl sulfates, alkenyl sulfates, α-olefinsulfonates, α-sulfo fatty acids and α-sulfo fatty acid ester salts, alkane sulfonates, saturated fatty acid salts, unsaturated fatty acid salts, alkylether carboxylates, alkenylether carboxylates, amino acid-type surfactants, N-acylamino acid-type surfactants, alkyl phosphate and salts of these, and alkenyl phosphates and salts of these. The alkyl groups or alkenyl groups in these anionic surfactants may have alkyl side groups such as methyl side group.

Suitable examples of nonionic surfactants include polyoxyalkylene alkyl ethers, polyoxyalkylene alkenyl ethers, polyoxyethylene alkyl phenyl ethers, higher-fatty-acid alkanol amides and alkylene oxide adducts thereof, sucrose fatty acid esters, alkyl glycoxydes, fatty acid glycerin monoesters, and alkylamine oxides. The alkyl groups or the alkenyl groups in these nonionic surfactants may have alkyl side groups such as methyl side group.

Suitable examples of cationic surfactants include quarternary ammonium salts. Preferred examples of amphoteric surfactants include carboxyl-type amphoteric surfactants, and sulfobetaine-type amphoteric surfactants. The alkyl groups or the alkenyl groups in these cationic surfactants and amphoteric surfactants may have alkyl side groups such as methyl side group.

In detergent compositions, these surfactants are typically present at a level of 10 to 60% by mass based on 100% by mass of the total amount, and are preferably present at a level of 15 to 50% by mass, more preferably at a level of 20 to 45% by mass, and further more preferably at a level of 25 to 40% by mass. The use of surfactants at a too small level may result in insufficient washing performance, and the use of surfactants at a too high level is disadvantageous in terms of cost.

Suitable examples of additives include alkali builders, chelate builders, anti-redeposition agents for preventing redeposition of contaminants such as sodium carboxymethylcellulose, stain inhibitors such as benzotriazole and ethylenethiourea, soil release agents, color migration inhibitors, softening agents, alkaline substances for pH adjustment, perfumes, solubilizing agents, fluorescent agents, coloring agents, foaming agents, foam stabilizers, lustering agents, bactericides, bleaching agents, bleaching assistants, enzymes, dyes, and solvents. Powder detergent compositions preferably contain zeolite.

These detergent compositions may contain other detergent builders in addition to the amphoteric polymer of the present invention (or amphoteric polymer composition). Examples of other detergent builders are not particularly limited and include alkali builders such as carbonates, hydrogencarbonates, and silicates; chelate builders such as tripolyphosphates, pyrophosphates, Glauber's salt, nitrilotriacetates, ethylene diamine tetraacetates, citrates, salts of (meth)acrylic acid copolymers, acrylic acid-maleic acid copolymers, fumarates, and zeolite; and carboxyl derivatives of polysaccharides such as carboxymethyl cellulose. Examples of counter salts used with these builders include alkaline metals such as sodium and potassium, ammonium, and amines.

In the detergent compositions, the above additives and other detergent builders are preferably present at a level of 0.1 to 50% by mass based on 100% by mass of the total amount. The level is more preferably 0.2 to 40% by mass, further more preferably 0.3 to 35% by mass, still further more preferably 0.4 to 30% by mass, and particularly preferably 0.5 to 20% by mass. The use of the additives and other builders at a level of less than 0.1% by mass may result in insufficient washing performance, and the use of the additives and other builders at a level of more than 50% by mass is disadvantageous in terms of cost.

It is to be understood that the concept of the "detergent compositions" includes detergents used only for specific usages such as bleaching detergent in which the performance delivered by one component is improved, in addition to synthetic detergents of household detergents, detergents for industrial use such as detergents used in the textile industry and hard surface detergents.

When the detergent compositions are in the form of a liquid, the water content of the liquid detergent compositions is preferably 0.1 to 75% by mass, more preferably 0.2 to 70% by mass, further more preferably 0.5 to 65% by mass, still further more preferably 0.7 to 60% by mass, particularly preferably 1 to 55% by mass, and more particularly preferably 1.5 to 50% by mass.

When the detergent compositions are in the form of a liquid, the kaolin turbidity of the detergent compositions is preferably not more than 200 mg/L, more preferably not more than 150 mg/L, further more preferably not more than 120 mg/L, still further more preferably not more than 100 mg/L, and particularly preferably not more than 50 mg/L.

<Method for Measuring Kaolin Turbidity>

A uniformly stirred sample (liquid detergent) is charged in 50 mm square cells with a thickness of 10 mm, and bubbles are removed therefrom. Then, the sample is measured for turbidity (kaolin turbidity: mg/L) at 25° C. with a turbidimeter (trade name: NDH2000, product of Nihon Denshoku Industries Co., Ltd.).

Suitable examples of enzymes that can be mixed in the detergent compositions include proteases, lipases, and cellulases. Among these, proteases, alkali lipases, and alkali cellulases are preferable because of their high activity in alkali-washing liquids.

In the detergent compositions, the enzymes are preferably used at a level of not more than 5% by mass based on 100% by mass of the total amount. The use of more than 5% by mass of the enzymes will not further improve the washing performance and may be disadvantageous in cost.

Suitable examples of alkali builders include silicates, carbonates, and sulfates. Suitable examples of the chelate builders include diglycollic acid, oxycarboxylates, EDTA (ethylenediaminetetraacetic acid), DTPA (diethylenetriamine pentaacetic acid), STPP (sodium tripolyphosphate), and citratic acid. Water-soluble polycarboxylic acid-based polymers other than the polymer of the present invention may be used.

The detergent compositions have high dispersability and are less likely to show performance deterioration even when stored for a longtime, or to generate precipitation of impurities even when stored at low temperature. Therefore, the use of the detergent compositions provides detergents with strikingly high performance and stability.

Effects of the Invention

The amphoteric polymer of the present invention is designed as described above and has high anti-soil redeposition ability and compatibility with surfactants. Owing to these properties, the amphoteric polymer of the present invention can be used in highly concentrated liquid detergents, and can be suitably used as a raw material for detergent additives and the like.

BEST MODE FOR CARRYING OUT THE INVENTION

Hereinafter, the present invention is described in more detail based on examples, but is not limited only to these examples. All parts are by weight unless otherwise specified, and all percentages are by mass unless otherwise specified.

The monomers and intermediates were quantified and measured for various characteristic values by the methods described below.

<Qualitative Analysis of Cationic Group-Containing Monomer and Reaction Intermediate>

The intermediate of the cationic group-containing monomer was quantified by liquid chromatography under the conditions shown below. The yield of the cationic group-containing monomer was calculated from the inversion rate determined from the quantified result of the intermediate of the cationic group-containing monomer by liquid chromatography.

Measuring device: product of Hitachi High-Technologies Corporation
Column: CAPCELL PAK C18 MGII 4.6 mm$\phi$×250 mm, 5 μm (product of Shiseido Co., Ltd.)
Temperature: 40.0° C.
Eluant: 0.1% by weight formic acid/acetonitrile=6/4 (volume ratio)
Flow velocity: 1.0 ml/min
Detector: RI, UV (detection wavelength: 210 nm)

<Qualitative Analysis of Ethylene Oxide Adduct of Isoprenol>

The ethylene oxide adduct of isoprenol was quantified by high-speed chromatography under the following conditions.

Measuring device: 8020 series (product of Tosoh Corp.)
Column: CAPCELL PAK C1 UG120 (product of Shiseido Co., Ltd.)
Temperature: 40.0° C.
Eluant: dodecahydrate solution of 10 mmol/L disodium hydrogen phosphate (pH 7 (controlled with phosphoric acid))/acetonitrile=45/55 (volume ratio)
Flow velocity: 1.0 ml/min
Detector: RI, UV (detection wavelength: 215 nm)

<Qualitative Analysis of Carboxyl Group-Containing Monomer and Other Compound>

The carboxyl group-containing monomer and other compounds were quantified by liquid chromatography under the following conditions.

Measuring device: L-7000 series (product of Hitachi Ltd.)
Detector: UV detector, L-7400 (product of Hitachi Ltd.)
Column: SHODEX RSpak DE-413 (product of Showa Denko K.K.)
Temperature: 40.0° C.
Eluant: 0.1% phosphoric acid aqueous solution
Flow velocity: 1.0 ml/min <Measurement Condition of Weight Average Molecular Weight (GPC)>

Measuring device: L-7000 series (product of Hitachi Ltd.)
Detector: HITACHI RI Detector, L-7490
Column: TSK-guard column+TSK-GEL α-3000+TSK-GEL α-2500 (product of Tosoh Corp.)
Column temperature: 40° C.
Flow velocity: 0.4 mL/min
Calibration curve: POLYETHYLENE GLYCOL (product of GL Sciences, Inc.)
Eluant: 100 mM boric acid (pH 9.2)/acetonitrile=4/1 (wt/wt)

<Measurement of Solids Content>

A mixture of 1.0 g of an amphoteric polymer composition containing the amphoteric polymer of the present invention* and 1.0 g of water was left in an oven heated to 130° C. in nitrogen atmosphere for one hour so as to be dried. The solids content (%) and volatile component content (%) were calculated from the weight change before and after the drying step.

<Synthesis of Cationic Group-Containing Monomer (A)>

In the following monomer synthesis examples, the following compounds were used as polyalkylene glycol chain-containing monomers represented by the formula (3).

Ethylene oxide (average 10 mol) adduct of isoprenol having a hydroxyl value of 106.5 (mgKOH/g) (hereinafter, also referred to as "IPN10")

Ethylene oxide (average 25 mol) adduct of isoprenol having a hydroxyl value of 47.3 (mgKOH/g) (hereinafter, also referred to as "IPN25")

Ethylene oxide (average 50 mol) adduct of isoprenol having a hydroxyl value of 25.5 (mgKOH/g) (hereinafter, also referred to as "IPN50")

Synthesis Example 1

In a 1-L 4-neck flask, IPN 10 (400 g), epichlorohydrin (351.4 g), and 48% by mass aqueous solution of sodium hydroxide (hereinafter, also referred to as 48% NaOH) (94.9 g) were reacted under stirring for six hours at a controlled temperature of 50° C. Thereafter, the generated salt was removed and epichlorohydrin and water were removed from the remaining organic phase such that a reaction solution (451.2 g) containing an intermediate (IPEG 10) (324.9 g) and IPN 10 (64.1 g) was provided. Subsequently, the reaction solution (451.2 g) containing IPEG 10 (324.9 g) and 30% by mass aqueous solution of trimethylamine chloride (268.7 g) were reacted in the 1-L 4-neck flask for eight hours at a controlled temperature of 50° C. such that a reaction solution (hereinafter, referred to as monomer composition (1)) (719.9 g) containing cationized IPN 10 (hereinafter, also referred to as IPEC 10) (336.4 g) and IPN 10 (63.8 g) was provided.

Synthesis Example 2

In a 1-L 4-neck flask, IPN 25 (500 g), epichlorohydrin (233.7 g), and NaOH in the pellet form (25.3 g) were reacted under stirring for 16 hours at a controlled temperature of 50° C. Thereafter, the generated salt was removed and epichlorohydrin and water were removed from the remaining organic phase such that a reaction solution (499.4 g) containing an intermediate (IPEG 25) (389.1 g) and IPN 25 (43.5 g) was provided. Subsequently, the reaction solution (499.4 g) containing IPEG 25 (389.1 g) and 30% by mass aqueous solution of trimethylamine chloride (143.6 g) were reacted in the 1-L 4-neck flask for 12 hours at a controlled temperature of 50° C. such that a reaction solution (hereinafter, referred to as monomer composition (2)) (643.0 g) containing cationized IPN 25 (hereinafter, also referred to as IPEC 25) (376.7 g) and IPN 25 (41.3 g) was provided.

Synthesis Example 3

In a 200-ml 4-neck flask, IPN 50 (100 g), epichlorohydrin (25.0 g), and NaOH in the pellet form (2.6 g) were reacted under stirring for 16 hours at a controlled temperature of 50° C. Thereafter, the generated salt was removed and epichlorohydrin and water were removed from the remaining organic phase such that a reaction solution (102.3 g) containing an intermediate (IPEG 50) (71.7 g) and IPN 50 (10.0 g) was provided. Subsequently, the reaction solution (102.3 g) containing IPEG 50 (71.7 g) and 30% by mass aqueous solution of trimethylamine chloride (12.6 g) were reacted in the 200-ml 4-neck flask for 12 hours at a controlled temperature of 50° C. such that a reaction solution (hereinafter, referred to as monomer composition (3)) (114.9 g) containing cationized IPN 50 (hereinafter, also referred to as IPEC 50) (67.2 g) and IPN 50 (9.8 g) was provided.

Synthesis Example 4

IPEG 10 (100.0 g) synthesized in the same manner as in Synthesis Example 1 and diethanolamine (17.4 g) were stirred for eight hours at a controlled temperature of 80° C. such that a monomer composition (4) (117.4 g) was provided. Liquid chromatography analysis showed that the monomer composition (4) included the amino compound of IPN 10 represented by the formula (1') in which $R^5$ and $R^6$ are —$CH_2CH_2OH$ (hereinafter, also referred to as IPEA 10-DEA) (80.8 g) and IPN 10 (10.2 g).

Synthesis Example 5

IPEG 10 (100.0 g) synthesized in the same manner as in Synthesis Example 1 and dibutylamine (23.2 g) were stirred for eight hours at a controlled temperature of 100° C. such that a monomer composition (5) (123.2 g) was provided. Liquid chromatography analysis showed that the monomer composition (5) included the amino compound of IPN 10 represented by the formula (1') in which $R^5$ and $R^6$ are —$C_4H_9$ (hereinafter, also referred to as IPEA 10-DBuA) (83.6 g) and IPN 10 (10.2 g).

<Production of Amphoteric Polymer>

Example 1

In a 1000-mL glass separable flask equipped with a reflux condenser and a stirrer (paddle blade), pure water (100.0 g) and Mohr's salt (0.0057 g) were stirred while the temperature was increased to 70° C. such that the polymerization reaction system was prepared. To the polymerization reaction system being stirred and controlled to 70° C., 80% acrylic acid aqueous solution (hereinafter, referred to as 80% AA) (148.5 g), the monomer composition (1) (174.2 g), IPN 10 (36.2 g), 15% sodium persulfate aqueous solution (hereinafter, referred to as 15% NaPS) (90.9 g), 35% sodium hydrogen sulfite (hereinafter, referred to as 35% SBS) (16.7 g), and pure water (147.5 g) were added dropwise through different nozzles.

The drop-wise addition of each solution was started at the same time. The drop-wise addition times of 80% AA, the monomer composition (1), IPN 10, 15% NaPS, 35% SBS, and pure water were 180 minutes, 120 minutes, 120 minutes, 190 minutes, 180 minutes, and 180 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% sodium hydroxide (hereinafter, abbreviated as 48% NaOH) (96.3 g). Through these steps, a copolymer composition (1) containing a copolymer (1) was prepared. The solids content of the copolymer composition (1) was 45%.

Example 2

In a 1000-mL glass separable flask equipped with a reflux condenser and a stirrer (paddle blade), pure water (100.0 g) and Mohr's salt (0.0057 g) were stirred while the temperature was increased to 70° C. such that the polymerization reaction system was prepared. To the polymerization reaction system being stirred and controlled to 70° C., 80% AA (150.3 g), the monomer composition (1) (44.1 g), IPN10 (144.4 g), 15% NaPS (93.5 g), 35% SBS (17.2 g), and pure water (162.4 g) were added dropwise through different nozzles.

The drop-wise addition of each solution was started at the same time. The drop-wise addition times of 80% AA, the monomer composition (1), IPN 10, 15% NaPS, 35% SBS, and pure water were 180 minutes, 120 minutes, 120 minutes, 190 minutes, 180 minutes, and 180 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (97.4 g). Through these steps, a copolymer composition (2) containing a copolymer (2) was prepared. The solids content of the copolymer composition (2) was 45%.

Example 3

In a 1000-mL glass separable flask equipped with a reflux condenser and a stirrer (paddle blade), pure water (100.0 g) and Mohr's salt (0.0056 g) were stirred while the temperature was increased to 70° C. such that the polymerization reaction system was prepared. To the polymerization reaction system being stirred and controlled to 70° C., 80% AA (270.0 g), the monomer composition (1) (39.6 g), IPN10 (21.7 g), 15% NaPS (61.9 g), 35% SBS (53.0 g), and pure water (82.3 g) were added dropwise through different nozzles. The drop-wise addition of each solution was started at the same time. The drop-wise addition times of 80% AA, the monomer composition (1), IPN 10, 15% NaPS, 35% SBS, andpure water were 180 minutes, 150 minutes, 150 minutes, 190 minutes, 180 minutes, and 150 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (175.0 g). Through these steps, a copolymer composition (3) containing a copolymer (3)) was prepared. The solids content of the copolymer composition (3) was 45%.

Example 4

In a 1000-mL glass separable flask equipped with a reflux condenser and a stirrer (paddle blade), pure water (100.0 g) and Mohr's salt (0.0057 g) were stirred while the temperature was increased to 70° C. such that the polymerization reaction system was prepared. To the polymerization reaction system being stirred and controlled to 70° C., 80% AA (145.8 g), the monomer composition (1) (17.1 g), IPN10 (161.0 g), 15% NaPS (65.0 g), 35% SBS (55.7 g), and pure water (166.6 g) were added dropwise through different nozzles. The drop-wise addition of each solution was started at the same time.

The drop-wise addition times of 80% AA, the monomer composition (1), IPN 10, 15% NaPS, 35% SBS, and pure water were 180 minutes, 120 minutes, 120 minutes, 190 minutes, 180 minutes, and 120 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (94.5 g). Through these steps, a copolymer composition (4) containing a copolymer (4) was prepared. The solids content of the copolymer composition (4) was 45%.

Example 5

In a 1000-mL glass separable flask equipped with a reflux condenser and a stirrer (paddle blade), pure water (100.0 g) and Mohr's salt (0.0056 g) were stirred while the temperature was increased to 70° C. such that the polymerization reaction system was prepared. To the polymerization reaction system being stirred and controlled to 70° C., 80% AA (256.5 g), the monomer composition (1) (15.0 g), IPN10 (39.0 g), 15% NaPS (98.1 g), 35% SBS (84.1 g), and pure water (43.5 g) were added dropwise through different nozzles.

The drop-wise addition of each solution was started at the same time. The drop-wise addition times of 80% AA, the monomer composition (1), IPN 10, 15% NaPS, 35% SBS, and pure water were 180 minutes, 150 minutes, 150 minutes, 190 minutes, 180 minutes, and 150 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (166.3 g). Through these steps, a copolymer composition (5) containing a copolymer (5) was prepared. The solids content of the copolymer composition (5) was 45%.

Example 6

In a 300-mL glass separable flask equipped with a reflux condenser and a stirrer (paddle blade), pure water (20.9 g) and Mohr's salt (0.0009 g) were stirred while the temperature was increased to 70° C. such that the polymerization reaction system was prepared. To the polymerization reaction system being stirred and controlled to 70° C., 80% AA (31.5 g), the monomer composition (1) (2.5 g), IPN10 (14.8 g), 15% NaPS (12.7 g), 35% SBS (10.9 g), and pure water (10.0 g) were added dropwise through different nozzles.

The drop-wise addition of each solution was started at the same time. The drop-wise addition times of 80% AA, the monomer composition (1), IPN 10, 15% NaPS, 35% SBS, and pure water were 180 minutes, 150 minutes, 150 minutes, 190 minutes, 180 minutes, and 180 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (20.4 g). Through these steps, a copolymer composition (6) containing a copolymer (6) was prepared. The solids content of the copolymer composition (6) was 45%.

Example 7

In a 300-mL glass separable flask equipped with a reflux condenser and a stirrer (paddle blade), pure water (19.5 g) and Mohr's salt (0.0009 g) were stirred while the temperature was increased to 70° C. such that the polymerization reaction system was prepared. To the polymerization reaction system being stirred and controlled to 70° C., 80% AA (31.5 g), the monomer composition (1) (18.5 g), IPN10 (1.7 g), 15% NaPS (12.6 g), 35% SBS (10.8 g), and pure water (10.0 g) were added dropwise through different nozzles.

The drop-wise addition of each solution was started at the same time. The drop-wise addition times of 80% AA, the monomer composition (1), IPN 10, 15% NaPS, 35% SBS, and pure water were 180 minutes, 150 minutes, 150 minutes, 190 minutes, 180 minutes, and 180 minutes, respectively. The drop rate of each solution was constant and each aqueous solution was continuously added dropwise. After the drop-wise addition of 15% NaPS, the reaction solution was maintained (matured) at 70° C. for more 30 minutes and the polymerization was completed. After the completion of polymerization; the polymerization reaction solution was stirred and left standing to be cooled, and then was neutralized with 48% NaOH (20.4 g). Through these steps, a copolymer composition (7) containing a copolymer (7) was prepared. The solids content of the copolymer composition (7) was 45%.

Example 8

In a 300-mL glass separable flask equipped with a reflux condenser and a stirrer (paddle blade), pure water (26.9 g) and Mohr's salt (0.0009 g) were stirred while the temperature was increased to 70° C. such that the polymerization reaction system was prepared. To the polymerization reaction system being stirred and controlled to 70° C., 80% AA (22.5 g), the monomer composition (1) (33.0 g), IPN10 (0.1 g), 15% NaPS (13.7 g), 35% SBS (2.5 g), and pure water (10.0 g) were added dropwise through different nozzles.

The drop-wise addition of each solution was started at the same time. The drop-wise addition times of 80% AA, the monomer composition (1), IPN 10, 15% NaPS, 35% SBS, and pure water were 180 minutes, 150 minutes, 150 minutes, 190 minutes, 180 minutes, and 180 minutes, respectively. The drop rate of each solution was constant and each aqueous solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (14.6 g). Through these steps, a copolymer composition (8) containing a copolymer (8) was prepared. The solids content of the copolymer composition (8) was 45%.

Example 9

In a 300-mL glass separable flask equipped with a reflux condenser and a stirrer (paddle blade), pure water (74.9 g), the monomer composition (1) (33.9 g), maleic acid (hereinafter, referred to as MA) (10.1 g), and 35% hydrogen peroxide solution (hereinafter, referred to as 35% $H_2O_2$) (0.3 g) were stirred while the temperature was increased to 60° C. such that the polymerization reaction system was prepared. To the polymerization reaction system being stirred and controlled to 60° C., 1.5% L-ascorbic acid aqueous solution (hereinafter, referred to as 1.5% L-AS) (7.9 g) was all added dropwise at once.

Thereafter, the reaction solution was maintained (matured) at 60° C. for 60 minutes and the polymerization was completed. After the completion of polymerization, the polymerization reaction solution was stirred and left standing to be cooled. Pure water (26.0 g) and 48% NaOH (13.0 g) were added to neutralize the polymerization reaction solution. Through these steps, a copolymer composition (9) containing a copolymer (9) was prepared. The solids content of the copolymer composition (9) was 25%.

Example 10

In a 1000-mL glass separable flask equipped with a reflux condenser and a stirrer (paddle blade), pure water (150.0 g) and Mohr's salt (0.0057 g) were stirred while the temperature was increased to 70° C. such that the polymerization reaction system was prepared. To the polymerization reaction system being stirred and controlled to 70° C., 80% AA (158.4 g), the monomer composition (2) (55.7 g), IPN 25 (189.2 g), 15% NaPS (92.3 g), 35% SBS (17.0 g), and pure water (48.3 g) were added dropwise through different nozzles.

The drop-wise addition of each solution was started at the same time. The drop-wise addition times of 80% AA, the monomer composition (2), IPN 25, 15% NaPS, 35% SBS, and pure water were 180 minutes, 150 minutes, 150 minutes, 190 minutes, 180 minutes, and 180 minutes, respectively. The drop rate of each solution was constant and each aqueous solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (102.7 g). Through these steps, a copolymer composition (10) containing a copolymer (10) was prepared. The solids content of the copolymer composition (10) was 45%.

Example 11

In a 1000-mL glass separable flask equipped with a reflux condenser and a stirrer (paddle blade), pure water (150.0 g) and Mohr's salt (0.0057 g) were stirred while the temperature was increased to 70° C. such that the polymerization reaction system was prepared. To the polymerization reaction system being stirred and controlled to 70° C., 80% AA (288.0 g), the monomer composition (2) (50.6 g), IPN 25 (28.0 g), 15% NaPS (65.5 g), 35% SBS (46.8 g), and pure water (0.4 g) were added dropwise through different nozzles.

The drop-wise addition of each solution was started at the same time. The drop-wise addition times of 80% AA, the monomer composition (2), IPN 25, 15% NaPS, 35% SBS, and pure water were 180 minutes, 150 minutes, 150 minutes, 190 minutes, 180 minutes, and 180 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (186.7 g). Through these steps, a copolymer composition (11) containing a copolymer (11) was prepared. The solids content of the copolymer composition (11) was 45%.

Example 12

In a 1000-mL glass separable flask equipped with a reflux condenser and a stirrer (paddle blade), pure water (150.0 g) and Mohr's salt (0.0061 g) were stirred while the temperature was increased to 70° C. such that the polymerization reaction system was prepared. To the polymerization reaction system being stirred and controlled to 70° C., 80% AA (162.0 g), the monomer composition (4) (89.9 g), IPN 10 (116.6 g), 15% NaPS (99.9 g), 35% SBS (18.3 g), and pure water (126.1 g) were added dropwise through different nozzles.

The drop-wise addition of each solution was started at the same time. The drop-wise addition times of 80% AA, the monomer composition (4), IPN 10, 15% NaPS, 35% SBS, and pure water were 180 minutes, 120 minutes, 120 minutes, 190 minutes, 180 minutes, and 180 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (105.0 g). Through these steps, a copolymer composition (12) containing a copolymer (12) was prepared. The solids content of the copolymer composition (12) was 45%.

Example 13

In a 1000-mL glass separable flask equipped with a reflux condenser and a stirrer (paddle blade), pure water (150.0 g) and Mohr's salt (0.0061 g) were stirred while the temperature was increased to 70° C. such that the polymerization reaction system was prepared. To the polymerization reaction system being stirred and controlled to 70° C., 80% AA (162.0 g), the monomer composition (5) (89.9 g), IPN 10 (117.9 g), 15% NaPS (120.5 g), 35% SBS (18.3 g), and pure water (120.5 g) were added dropwise through different nozzles.

The drop-wise addition of each solution was started at the same time. The drop-wise addition times of 80% AA, the monomer composition (5), IPN 10, 15% NaPS, 35% SBS, and pure water were 180 minutes, 120 minutes, 120 minutes, 190 minutes, 180 minutes, and 180 minutes, respectively. The drop rate of each solution was constant and each solution was continuously added dropwise. After the drop-wise addition of 15% NaPS, the reaction solution was maintained (matured) at 70° C. for more 30 minutes and the polymerization was completed. After the completion of polymerization, the polymerization reaction solution was stirred and left standing to be cooled, and then was neutralized with 48% NaOH (105.0 g). Through these steps, a copolymer composition (13) containing a copolymer (13) was prepared. The solids content of the copolymer composition (13) was 45%.

Comparative Example 1

In a 500-mL glass separable flask equipped with a reflux condenser tube and a stirrer, pure water (75.0 g) and Mohr's salt (0.0025 g) were stirred while the temperature was increased to 70° C. Thereafter, 80% AA (65.0 g), 80% aqueous solution of ethylene oxide (25 mol) adduct of isoprenol (hereinafter, referred to as 80% IPN 25) (97.5 g), 15% NaPS (26.3 g), and 35% SBS (22.5 g) were added dropwise through different nozzles. The drop-wise addition times of 80% AA, 80% IPN 25, 15% NaPS, and 35% SBS were 180 minutes, 150 minutes, 190 minutes, and 180 minutes, respectively. The drop-wise addition of each solution was started at the same time. The temperature was controlled to 70° C. until the completion of drop-wise addition of 15% NaPS. The resulting solution was matured at the same controlled temperature for 30 minutes after the completion of drop-wise addition of 15% NaPS and the polymerization was completed. After the completion of polymerization, the polymerization reaction solution was left standing to be cooled and then was neutralized with 48% NaOH (42.1 g). Through these steps, a comparison polymer composition (1) containing a comparison polymer (1) was prepared. The solids content of the comparison polymer composition (1) was 45%.

Comparative Example 2

In a 1000-mL glass separable flask equipped with a reflux condenser tube and a stirrer, pure water (169.2 g), 60% aqueous solution of ethylene oxide (50 mol) adduct of isoprenol (hereinafter, referred to as 60% IPN 50) (350.0 g), and Mohr's salt (0.0056 g) were stirred while the temperature was increased to 90° C. Thereafter, 80% AA (112.5 g), 15% NaPS (35.8 g), and 35% SBS (30.7 g) were added dropwise through different nozzles. The drop-wise addition times of 80% AA, 15% NaPS, and 35% SBS were 180 minutes, 210 minutes, and 180 minutes, respectively. The drop-wise addition of each solution was started at the same time. The temperature was controlled to 90° C. until the completion of drop-wise addition of 15% NaPS. The reaction solution was matured at the same controlled temperature for 30 minutes after the completion of drop-wise addition of 15% NaPS. After the completion of polymerization, the polymerization reaction solution was left standing to be cooled and then was neutralized with 48% NaOH (95.8 g). Through these steps, a comparison polymer composition (2) containing a comparison polymer (2) was prepared. The solids content of the comparison polymer composition (2) was 45%.

The copolymer compositions (1) to (13) were evaluated by $^1$HNMR analysis. No peaks representing the monomers were found in the results, indicating that the composition of each polymer corresponds to the composition of the used materials.

The copolymers (1) to (13) prepared in Examples 1 to 13 and the comparison polymers (1) and (2) prepared in Comparative Examples 1 and 2 were evaluated for performance as described below. Tables 1 and 2 show the results.

<Anti-Soil Redeposition Ability Test/JIS Test Powders I Class 11>

(1) Cotton cloth available from Test fabric was cut into 5 cm×5 cm white clothes. The degree of whiteness was determined for the white clothes by measuring the reflectance with a colorimetric color difference meter (SE2000, product of Nippon Denshoku Industries Co., Ltd.).

(2) Pure water was added to calcium chloride dihydrate (5.88 g) such that hard water (20 kg) was prepared.

(3) Pure water was added to sodium linear alkylbenzene sulfonate (8.0 g), sodium bicarbonate (9.5 g), and sodium sulfate (8.0 g) such that a surfactant aqueous solution (100.0 g) was prepared. The pH was controlled to 10.

(4) A targotmeter was set at 25° C. Hard water (2 L), the surfactant aqueous solution (5 g), 0.8% (based on solids content) polymer aqueous solution (5 g), zeolite (0.30 g), and JIS test powders I Class ll (1.0 g) were stirred for one minute in a pot at 100 rpm. Subsequently, seven white cloths were put into the mixture, and the mixture was stirred for ten minutes at 100 rpm.

(5) The white cloths were wringed by hand, and the hard water (2 L) at 25° C. was poured into the pot and stirred at 100 rpm for two minutes.

(6) The white clothes were ironed with a cloth thereon to dry them while wrinkles were smoothed. The clothes were measured again for reflectance as whiteness with the colorimetric difference meter.

(7) The anti-soil redeposition ratio is determined from the following formula, based on the measurement results.

Anti-soil redeposition ratio (%)=(whiteness of white cloth after washed)/(whiteness of original white cloth)×100

<Compatibility with Surfactant>

Detergent compositions each containing a test sample (polymer or polymer composition) were prepared using the following materials.

SFT-70H (polyoxyethylene alkyl ether, product of NIPPON SHOKUBAI Co., Ltd.): 40 g NEOPELEX F-65 (sodium dodecylbenzene sulfonate, product of Kao Corp.): 7.7 g (active ingredient: 5 g)

Kohtamin 86W (stearyl trimethylammonium chloride, product of Kao Corp.): 17.9 g (active ingredient: 5 g)

Diethanolamine: 5 g
Ethanol: 5 g
Propylene glycol: 5 g
Test sample: 1.5 g (based on solids content)
Ion exchange water: balanced (the amount of ion exchange water was appropriately adjusted such that the total amount of the detergent composition was 100 g based on the amount of the test sample.)

The mixture was sufficiently stirred so that all the components were uniformly dispersed. Turbidity (kaolin turbidity, mg/l) of the mixture was evaluated by turbidity measured at 25° C. with a turbidimeter ("NDH2000", product of Nippon Denshoku Co., Ltd.).

The evaluation was based on the following criteria:

Good: Kaolin turbidity of not less than 0 and less than 50 (mg/l); phase separation, sedimentation, and turbidity were not visually observed.

Intermediate: Kaolin turbidity of not less than 50 and less than 200 (mg/l); slight turbidity was visually observed.

Bad: Kaolin turbidity of not less than 200 (mg/l); turbidity was visually observed.

TABLE 1

| | Polymer | Composition (wt %) | Mw | Compatibility |
|---|---|---|---|---|
| Example 1 | copolymer (1) | IPEC10/IPN10/ AA = 40/20/40 | 51000 | ◯ |
| Example 2 | copolymer (2) | IPEC10/IPN10/ AA = 10/50/40 | 53000 | ◯ |
| Example 3 | copolymer (3) | IPEC10/IPN10/ AA = 10/10/80 | 25000 | ◯ |
| Example 4 | copolymer (4) | IPEC10/IPN10/ AA = 4/56/40 | 24000 | ◯ |
| Example 5 | copolymer (5) | IPEC10/IPN10/ AA = 4/16/80 | 21000 | ◯ |
| Example 6 | copolymer (6) | IPEC10/IPN10/ AA = 4/36/60 | 62000 | ◯ |
| Example 7 | copolymer (7) | IPEC10/IPN10/ AA = 30/10/60 | 22000 | ◯ |
| Example 8 | copolymer (8) | IPEC10/IPN10/ AA = 50/10/40 | 59000 | ◯ |
| Example 9 | copolymer (9) | IPEC10/IPN10/ MA = 52/22/27 | 78000 | ◯ |
| Example 10 | copolymer (10) | IPEC25/IPN25/ AA = 10/50/40 | 54000 | ◯ |
| Example 11 | copolymer (11) | IPEC25/IPN25/ AA = 10/10/80 | 33000 | ◯ |
| Example 12 | copolymer (12) | IPEA10-DEA/ IPN10/ AA = 20/40/40 | 36000 | ◯ |
| Example 13 | copolymer (13) | IPEA10-DBuA/ IPN10/ AA = 20/40/40 | 32000 | ◯ |
| Comparative Example 1 | comparison polymer (1) | IPN10/AA = 60/40 | 22000 | ◯ |
| Comparative Example 2 | comparison polymer (2) | IPN50/AA = 70/30 | 20000 | ◯ |

TABLE 2

| Polymer | | Anti-Soil Redeposition Ability (%) |
| --- | --- | --- |
| Example 2 | copolymer (2) | 77.5 |
| Example 3 | copolymer (3) | 76.5 |
| Example 7 | copolymer (7) | 78.6 |
| Example 11 | copolymer (11) | 77.4 |
| Comparative Example 1 | comparison polymer (1) | 76.1 |
| Comparative Example 2 | comparison polymer (2) | 75.4 |

The results shown in Table 1 indicate that the copolymers (1) to (13) and the comparison polymers (1) and (2) were all highly compatible with surfactants but that all of the copolymers (1) to (13) have higher anti-soil redeposition ability compared to the comparison polymers (1) and (2). These results suggest the technical importance of use of the amphoteric polymer of a specific structure.

The invention claimed is:

1. An amphoteric polymer comprising:
   a structure unit (a) derived from a cationic group-containing monomer (A); and
   a structure unit (b) derived from a carboxyl group-containing monomer (B),
   the cationic group-containing monomer (A) represented by the formula (1) or (1'):

[Chem. 1]

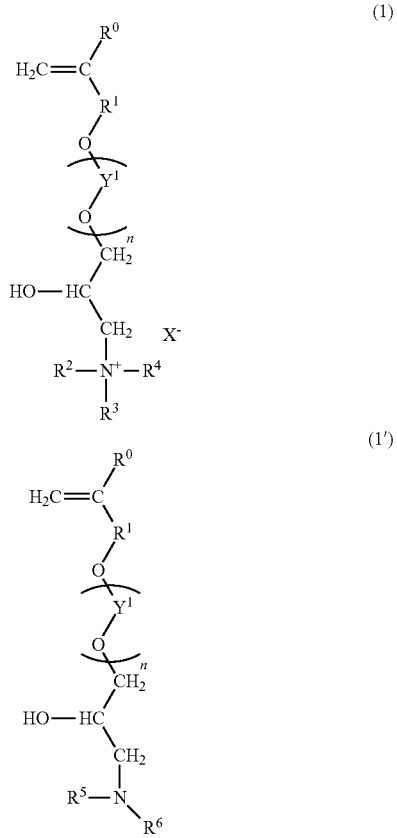

wherein $R^0$ represents $CH_3$; $R^1$ represents $CH_2CH_2$; $R^2$, $R^3$, and $R^4$ each represent a $C_{1-20}$ organic group, and each of $R^2$, $R^3$, and $R^4$ may be the same as or different from each other; $R^5$ and $R^6$ each represent H or a $C_{1-20}$ organic group and may be the same as or different from each other; $Y^1$ represents a $C_{2-20}$ alkylene group, and each of $Y^1$s may be the same as or different from each other; n represents an average addition number of moles of oxyalkylene groups ($-Y^1-O-$) and is from 1 to 300; and $X^-$ represents a counteranion, wherein, the structure unit (a) is present at a level of 1 to 99% by mass based on 100% by mass of all structure units derived from all monomers in the amphoteric polymer, and the structure unit (b) is present at a level of 1 to 99% by mass based on 100% by mass of all the structure units derived from all the monomers in the amphoteric polymer.

2. The amphoteric polymer according to claim 1, wherein $Y^1$ in the formulae (1) and (1') represents $C_{2-4}$ alkylene group.

3. The amphoteric polymer according to claim 1, wherein n in the formulae (1) and (1') is from 5 to 200.

4. The amphoteric polymer according to claim 1, wherein the amphoteric polymer has a weight average molecular weight in the range of from 2,000 to 200,000.

5. The amphoteric polymer according to claim 1, wherein the amphoteric polymer further comprises a structure unit (e) derived from a monomer (E) other than the cationic group-containing monomer (A) and the carboxyl group-containing monomer (B), wherein the monomer (E) is a monomer obtained by adding alkylene oxides to (meth)allyl alcohol or isoprenol or both.

6. The amphoteric polymer according to claim 1, wherein n in the formulae (1) and (1') is 25 or more.

7. A process for producing an amphoteric polymer, comprising polymerizing a cationic group-containing monomer (A) and a carboxyl group-containing monomer (B), the cationic group-containing monomer represented by the formula (1) or (1'):

[Chem. 2]

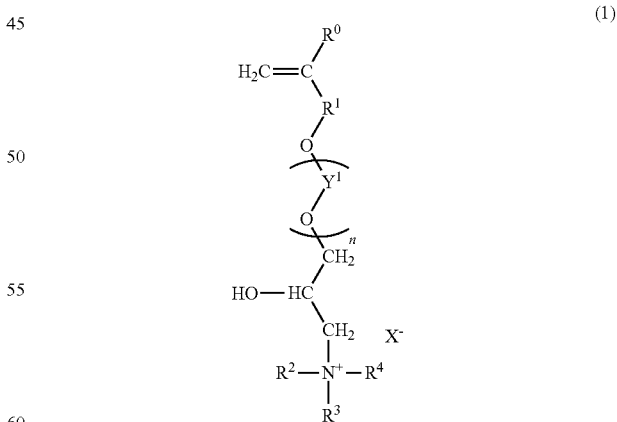

-continued

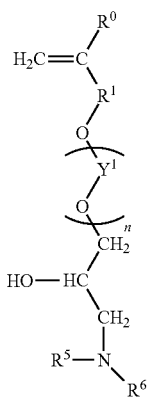

(1')

wherein $R^0$ represents $CH_3$; $R^1$ represents $CH_2CH_2$; $R^2$, $R^3$, and $R^4$ each represent a $C_{1-20}$ organic group, and each of $R^2$, $R^3$, and $R^4$ may be the same as or different from each other; $R^5$ and $R^6$ each represent H or a $C_{1-20}$ organic group and may be the same as or different from each other; $Y^1$ represents a $C_{2-20}$ alkylene group, and each of $Y^1$s may be the same as or different from each other; n represents an average addition number of moles of oxyalkylene groups (—$Y^1$—O—) and is from 1 to 300; and $X^-$ represents a counteranion, and wherein the cationic group-containing monomer (A) is added at a level of from 1 to 99% by mass based on 100% by mass of all monomers to be added, and the carboxyl group-containing monomer (B) is added at a level of from 1 to 99% by mass based on 100% by mass of all the monomers to be added.

8. The process for producing an amphoteric polymer according to claim 7, wherein $Y^1$ in the formulae (1) and (1') represents $C_{2-4}$ alkylene group.

9. The process for producing an amphoteric polymer according to claim 2, wherein n in the formulae (1) and (1') is from 5 to 200.

10. The process for producing an amphoteric polymer according to claim 7, wherein the amphoteric polymer has a weight average molecular weight in the range of from 2,000 to 200,000.

11. The process for producing an amphoteric polymer according to claim 7, wherein the amphoteric polymer further comprises a structure unit (e) derived from a monomer (E) other than the cationic group-containing monomer (A) and the carboxyl group-containing monomer (B), wherein the monomer (E) is a monomer obtained by adding alkylene oxides to (meth)allyl alcohol or isoprenol or both.

12. The process for producing an amphoteric polymer according to claim 2, wherein n in the formulae (1) and (1') is 25 or more.

* * * * *

UNITED STATES PATENT AND TRADEMARK OFFICE
CERTIFICATE OF CORRECTION

| | | |
|---|---|---|
| PATENT NO. | : 8,076,434 B1 | Page 1 of 1 |
| APPLICATION NO. | : 12/976242 | |
| DATED | : December 13, 2011 | |
| INVENTOR(S) | : Atsuro Yoneda et al. | |

It is certified that error appears in the above-identified patent and that said Letters Patent is hereby corrected as shown below:

Column 46, line 11, "claim 2" should read "claim 7"; and

Column 46, line 25, "claim 2" should read "claim 7".

Signed and Sealed this
Twenty-eighth Day of February, 2012

David J. Kappos
*Director of the United States Patent and Trademark Office*